US009196915B2

(12) United States Patent
Kawahara et al.

(10) Patent No.: US 9,196,915 B2
(45) Date of Patent: Nov. 24, 2015

(54) METHODS AND SYSTEMS FOR CONTROLLING POWER OUTPUT OF A FUEL CELL

(75) Inventors: Shuya Kawahara, Gotenba (JP); Manabu Kato, Susono (JP); Hideyuki Kumei, Shizuoka-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 246 days.

(21) Appl. No.: 13/583,984

(22) PCT Filed: May 25, 2011

(86) PCT No.: PCT/IB2011/001478
§ 371 (c)(1),
(2), (4) Date: Sep. 11, 2012

(87) PCT Pub. No.: WO2011/148265
PCT Pub. Date: Dec. 1, 2011

(65) Prior Publication Data
US 2013/0059215 A1    Mar. 7, 2013

(30) Foreign Application Priority Data

May 25, 2010   (JP) ................................. 2010-119448
Oct. 6, 2010   (JP) ................................. 2010-226568

(51) Int. Cl.
H01M 8/04    (2006.01)

(52) U.S. Cl.
CPC ........ *H01M 8/04589* (2013.01); *H01M 8/0432* (2013.01); *H01M 8/0494* (2013.01); *H01M 8/04559* (2013.01); *H01M 8/04679* (2013.01);
(Continued)

(58) Field of Classification Search
None
See application file for complete search history.

(56) References Cited

U.S. PATENT DOCUMENTS

2005/0233186 A1    10/2005   Ryoichi et al.

FOREIGN PATENT DOCUMENTS

JP    2006-49259    2/2006
JP    2006-179389    7/2006
(Continued)

OTHER PUBLICATIONS

International Search Report in International Application No. PCT/IB2011/001478; Mailing Date: Nov. 7, 2011.
(Continued)

*Primary Examiner* — Ula C Ruddock
*Assistant Examiner* — Tony Chuo
(74) *Attorney, Agent, or Firm* — Finnegan, Henderson, Farabow, Garrett & Dunner, LLP

(57) ABSTRACT

A fuel cell system and a control method therefor are provided. The fuel cell system includes: a fuel cell formed of a plurality of stacked power generating elements; a cell voltage measuring unit detecting negative voltage in any one of the power generating elements; a control unit controlling electric power output from the fuel cell; and an accumulated current value measuring unit measuring an accumulated current value obtained by time integration of current output from the fuel cell. The control unit prestores a correlation between accumulated current values and current densities that are allowable for the fuel cell in a period during which negative voltage is generated. When negative voltage has been detected, the control unit executes output restricting process of restricting electric power output from the fuel cell so as to fall within an operation allowable range defined by the accumulated current values and current densities of the correlation.

18 Claims, 26 Drawing Sheets

(52) U.S. Cl.
CPC ...... *H01M 8/04768* (2013.01); *H01M 8/04835* (2013.01); *H01M 8/04992* (2013.01); *Y02E 60/50* (2013.01)

(56) References Cited

FOREIGN PATENT DOCUMENTS

| | | |
|---|---|---|
| JP | 2006-351421 | 12/2006 |
| JP | 2007-35516 | 2/2007 |
| WO | WO 2005/053075 A1 * | 6/2005 ............. H01M 8/04 |
| WO | WO 2008/132565 A2 | 11/2008 |

OTHER PUBLICATIONS

Written Opinion of the International Searching Authority in International Application No. PCT/IB2011/001478; Mailing Date: Nov. 7, 2011.

* cited by examiner

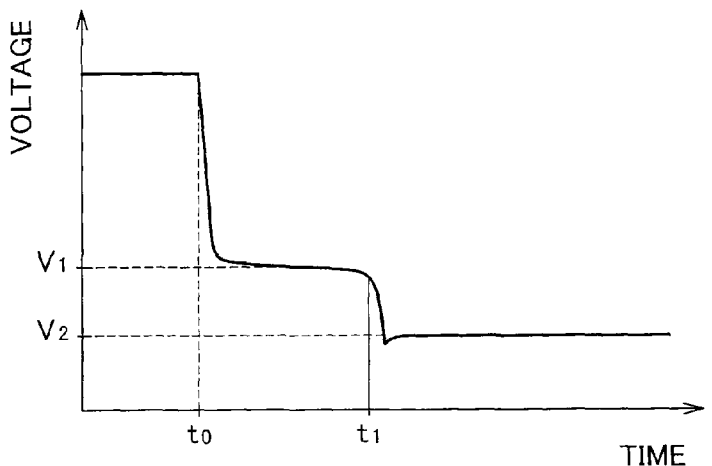
F I G .4A
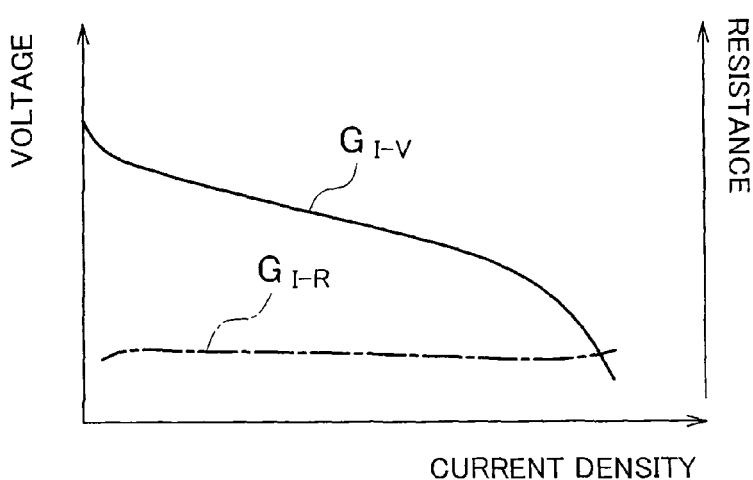
F I G .4B
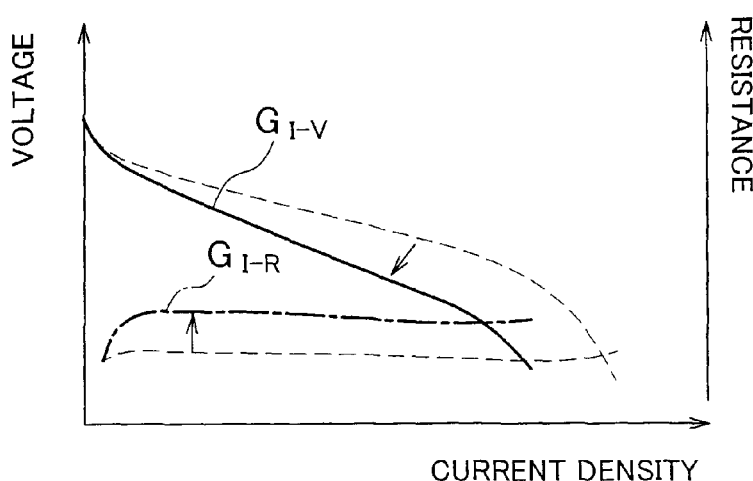
F I G .4C

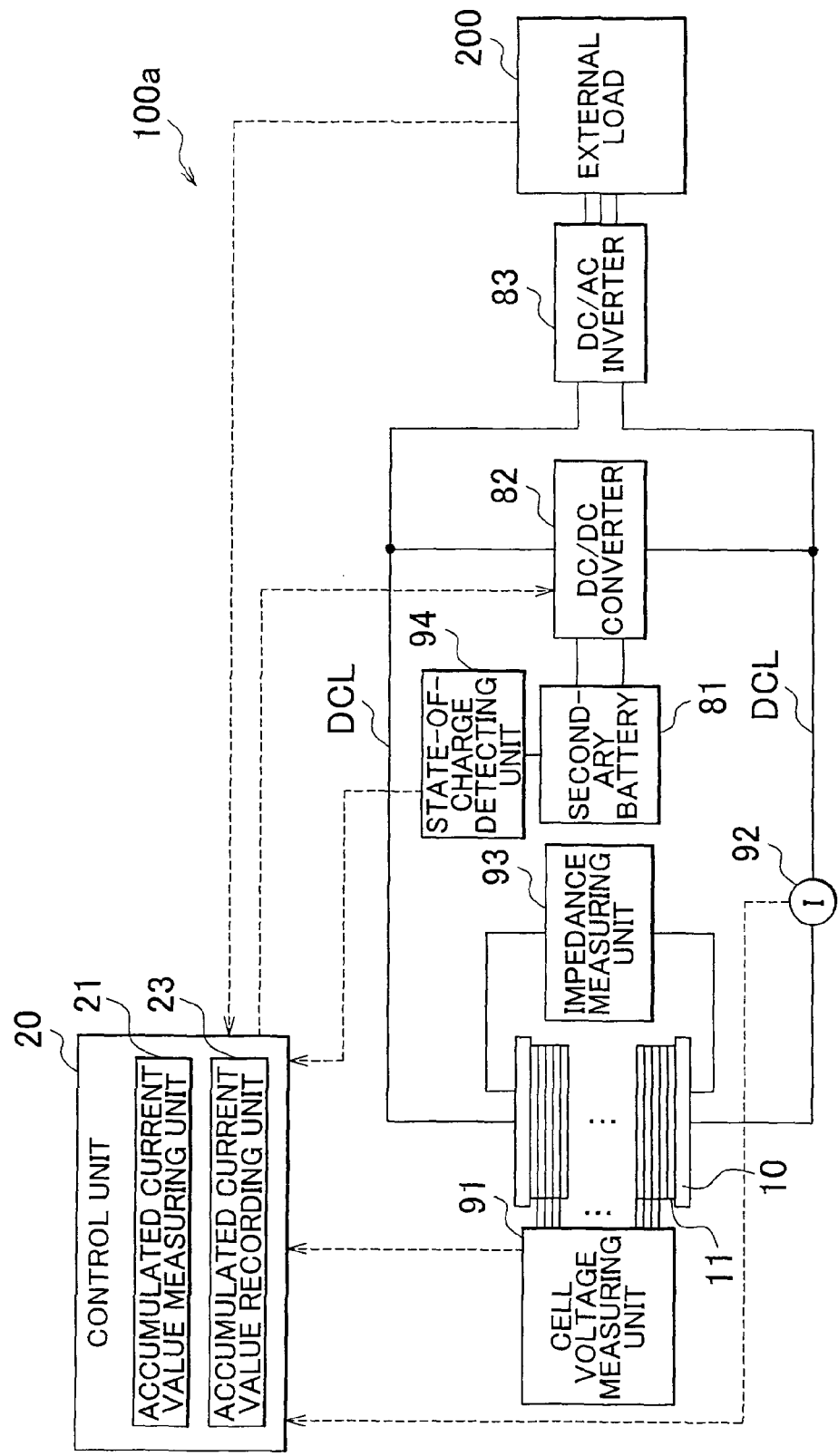

<REFERENCE EXAMPLE>

<REFERENCE EXAMPLE>

METHODS AND SYSTEMS FOR CONTROLLING POWER OUTPUT OF A FUEL CELL

CROSS-REFERENCE TO RELATED APPLICATIONS

This application is a national phase application of International Application No. PCT/IB2011/001478, filed May 25, 2011, and claims the priority of Japanese Application Nos. 2010-119448, filed May 25, 2010, and 2010-226568, filed Oct. 6, 2010, the content of both of which is incorporated herein by reference.

BACKGROUND OF THE INVENTION

1. Field of the Invention

The invention relates to a fuel cell.

2. Description of Related Art

A fuel cell usually has a stack structure in which a plurality of single cells that serve as power generating elements are stacked. Reaction gases flow into gas flow passages, provided for each single cell, via respective manifolds and are supplied to a power generating portion of each single cell. However, if the gas flow passages of part of the single cells are blocked by frozen water content, or the like, the amounts of reaction gases supplied to the part of the single cells become insufficient, so the part of the single cells may possibly generate negative voltage. In this way, when the operation of the fuel cell is continued in a state where part of the single cells generate negative voltage, not only the power generation performance of the fuel cell overall deteriorates but also the electrodes of those single cells may possibly degrade. Various techniques for suppressing deterioration of the power generation performance of a fuel cell or degradation of a fuel cell due to such negative voltage have been suggested so far (see Japanese Patent Application Publication No. 2006-179389 (JP-A-2006-179389), Japanese Patent Application Publication No. 2007-035516 (JP-A-2007-035516), and the like).

SUMMARY OF THE INVENTION

The invention provides a technique for suppressing performance deterioration and degradation of a fuel cell due to negative voltage.

The invention is contemplated to solve at least part of the above described problems, and may be implemented as the following embodiments or alternative embodiments.

An aspect of the invention provides a fuel cell system that outputs electric power generated in response to a request from an external load. The fuel cell system includes: a fuel cell that has at least one power generating element; a negative voltage detecting unit that is configured to detect negative voltage in the at least one power generating element; a control unit that is configured to control electric power output from the fuel cell; and an accumulated current value measuring unit that is configured to measure an accumulated current value that is obtained by time integration of current output from the fuel cell, wherein the control unit is configured to prestore a correlation between accumulated current values that are allowable in a period during which negative voltage is generated in the at least one power generating element and current densities that are allowable in the period, and, when negative voltage has been detected in the at least one power generating element, the control unit is configured to execute output restricting process of restricting electric power output from the fuel cell so as to fall within an operation allowable range defined by the allowable accumulated current values and allowable current densities of the correlation. Here, the inventors of the invention found that, in a power generating element in which negative voltage is generated, the timing at which oxidation of the electrode begins and the power generation performance begins to decrease may be defined by current output from the fuel cell in a period during which negative voltage is generated and an accumulated current value that is obtained by time integration of the current. With the thus configured fuel cell system, when negative voltage is generated, electric power output from the fuel cell is restricted so as to fall within the preset operation allowable range defined by the allowable accumulated current values and the allowable current densities. Thus, by presetting the operation allowable range that does not cause performance deterioration of the power generating element in which negative voltage is generated, it is possible to suppress performance deterioration of the fuel cell due to negative voltage and to suppress oxidation of the electrode (degradation of the electrode).

In addition, in the fuel cell system, when the correlation is shown by a graph of which a first axis represents an accumulated current value of the fuel cell and a second axis represents a current density of the fuel cell, the correlation may be shown as a downward-convex curve in which the allowable current density decreases as the allowable accumulated current value increases. With the above fuel cell system, in the correlation between accumulated current values and current densities, stored in the control unit, the operation allowable range may be set in an appropriate range that does not cause performance deterioration of the power generating element in which negative voltage is generated. Thus, it is possible to further appropriately suppress performance deterioration and degradation of the fuel cell due to negative voltage.

In addition, in the fuel cell system, in the output restricting process, the control unit may be configured to decrease the current density of the fuel cell along the downward-convex curve, which indicates maximum values of the allowable current densities, with an increase in the accumulated current value. With the above fuel cell system, when negative voltage is generated, it is possible to restrict electric power output from the fuel cell along the boundary values (allowable limit values) of the operation allowable range. Thus, it is possible to suppress performance deterioration and degradation of the fuel cell due to negative voltage while suppressing excessive restrictions on electric power output from the fuel cell.

In addition, the fuel cell system may further include: an operating state regulating unit that is configured to include at least one of a humidifying unit that controls a humidification amount of reaction gas supplied to the fuel cell in order to regulate a wet state inside the fuel cell and a refrigerant supply unit that controls a flow rate of refrigerant supplied to the fuel cell in order to regulate an operating temperature of the fuel cell; and a correlation changing unit that is configured to change the correlation in response to at least one of the wet state inside the fuel cell and the operating temperature of the fuel cell, wherein, when a current density corresponding to an output current required from the external load in a period during which negative voltage is generated in the at least one power generating element is larger than a predetermined value, the control unit may be configured to cause the operating state regulating unit to regulate at least one of the wet state inside the fuel cell and the operating temperature of the fuel cell so as to expand the operation allowable range in such a manner that the correlation is changed by the correlation changing unit. Here, the correlation between accumulated current values and current densities that are allowable for the fuel cell in a period during which negative voltage is generated varies depending on a wet state inside the fuel cell or an operating temperature of the fuel cell. With the thus configured fuel cell system, even when current required for the fuel cell falls outside the operation allowable range of the fuel cell, the required current may be brought to within the operation allowable range in such a manner that at least one of the wet state inside the fuel cell and the operating temperature of the fuel cell is regulated to expand the operation allowable range.

In addition, in the fuel cell system, when the output restricting process is completed, the control unit may be configured to nonvolatily store an accumulated current value of current output from the fuel cell in the output restricting process, and, when the output restricting process is resumed, the control unit may be configured to execute the output restricting process using a total accumulated current value that is obtained by adding the stored accumulated current value and an accumulated current value of current output from the fuel cell after the output restricting process is resumed. With the above fuel cell system, an accumulated current value is recorded even after a restart of the fuel cell system. Therefore, even when the current restricting process is executed again after a restart of the fuel cell system, the current restricting process is executed using the total accumulated current value that is accumulated from the recorded accumulated current value.

In addition, the fuel cell system may further include a warning unit that is configured to warn a user of degradation of the fuel cell, wherein the control unit may be configured to prestore a lower limit value of the current density of the fuel cell, and, when the current density of the fuel cell is lower than the lower limit value in the output restricting process, the control unit may be configured to cause the warning unit to warn the user of degradation of the fuel cell. With the above fuel cell system, when the fuel cell has not recovered from negative voltage but the preset lower limit value of the current density of the fuel cell has been reached during the output restricting process, the user is warned of degradation of the fuel cell. Thus, the user is able to appropriately know the timing at which the fuel cell should be maintained.

In addition, the fuel cell system may further include: a refrigerant supply unit that is configured to supply refrigerant to the fuel cell to control a temperature of the fuel cell; and a temperature measuring unit that is configured to measure an operating temperature of the fuel cell, wherein, in the output restricting process, the control unit may be configured to obtain an estimated heat value that is a heat value of the fuel cell when the fuel cell is caused to output electric power at a current density based on a current density command value to the fuel cell, and to control an amount of the refrigerant supplied to the fuel cell by the refrigerant supply unit on the basis of the operating temperature measured by the temperature measuring unit and the estimated heat value. With the above fuel cell system, even when electric power output from the fuel cell is restricted by executing the output restricting process, the flow rate of supplied refrigerant is appropriately controlled, so an increase in operating temperature of the fuel cell while the output restricting process is executed is facilitated. Thus, it is highly likely that the fuel cell recovers from the negative voltage state.

In the fuel cell system, in the output restricting process, the control unit may be configured to use the estimated heat value and the operating temperature measured by the temperature measuring unit to calculate an estimated temperature increase of the fuel cell when the fuel cell is caused to output electric power for a predetermined period of time while the fuel cell is being supplied with refrigerant, and, when the estimated temperature increase is smaller than or equal to a preset threshold, the control unit may be configured to cause the fuel cell to generate electric power in a state where the refrigerant supply unit is caused to stop supply of the refrigerant to the fuel cell. With the above fuel cell system, when it is difficult to bring the operating temperature of the fuel cell to a target value because electric power output from the fuel cell is restricted through the output restricting process, supply of refrigerant to the fuel cell is stopped. Thus, an increase in temperature of the fuel cell while the output restricting process is executed is facilitated; so it is highly likely that the fuel cell recovers from the negative voltage state.

In addition, in the fuel cell system, in the output restricting process, when a rate of increase in the operating temperature of the fuel cell is lower than a preset threshold, the control unit may be configured to cause the fuel cell to generate electric power in a state where the refrigerant supply unit is caused to stop supply of the refrigerant to the fuel cell. With the above fuel cell system, when the rate of increase in temperature of the fuel cell has not reached a target value according to the actually measured operating temperature of the fuel cell while the output restricting process is executed, supply of refrigerant to the fuel cell is stopped. Thus, an increase in temperature of the fuel cell while the output restricting process is executed is facilitated, so it is highly likely that the fuel cell recovers from the negative voltage state.

Another aspect of the invention provides a control method for a fuel cell system that outputs electric power generated by a fuel cell having at least one power generating element in response to a request from an external load. The control method includes: detecting negative voltage in the at least one power generating element; measuring an accumulated current value that is obtained by time integration of current output from the fuel cell in a period during which negative voltage is generated in the at least one power generating element; consulting a preset correlation between accumulated current values that are allowable in the period during which negative voltage is generated in the at least one power generating element and current densities that are allowable in the period; and executing output restricting process of restricting electric power output from the fuel cell so as to fall within an operation allowable range defined by the allowable accumulated current values and allowable current densities of the correlation.

A further another aspect of the invention provides a fuel cell system that outputs electric power generated in response to a request from an external load. The fuel cell system includes: a fuel cell that has at least one power generating element; a control unit that is configured to control electric power output from the fuel cell; and an accumulated current value measuring unit that is configured to measure an accumulated current value that is obtained by time integration of current output from the fuel cell, wherein the control unit is configured to prestore a correlation between accumulated current values that are allowable in a period during which negative voltage is generated in the at least one power generating element and current densities that are allowable in the period, and, when a preset environmental condition that indicates a possibility that negative voltage is generated is satisfied, the control unit is configured to determine that negative voltage is generated in the at least one power generating element and then to execute output restricting process of restricting electric power output from the fuel cell so as to fall within an operation allowable range defined by the allowable accumulated current values and allowable current densities of the correlation. With the thus configured fuel cell system, even when negative voltage is not generated, but when an environmental condition that is empirically or experimentally presumed as a case where it is highly likely that negative voltage is generated, the output restricting process is executed. Thus, it is possible to further reliably suppress performance deterioration and degradation of the fuel cell.

In addition, in the fuel cell system, when the correlation is shown by a graph of which a first axis represents an accumulated current value of the fuel cell and a second axis represents a current density of the fuel cell, the correlation may be shown as a downward-convex curve in which the allowable current density decreases as the allowable accumulated current value increases. With the above fuel cell system, in the correlation between accumulated current values and current densities, stored in the control unit, the operation allowable range may be set in an appropriate range that does not cause performance deterioration of the power generating element in which negative voltage is generated. Thus, it is possible to further appropriately suppress performance deterioration and degradation of the fuel cell due to negative voltage.

In addition, in the fuel cell system, in the output restricting process, the control unit may be configured to decrease the current density of the fuel cell along the downward-convex curve, which indicates maximum values of the allowable current densities, with an increase in the accumulated current value. With the above fuel cell system, when negative voltage is generated, it is possible to restrict electric power output from the fuel cell along the allowable limit values of the operation allowable range. Thus, it is possible to suppress performance deterioration and degradation of the fuel cell due to negative voltage while suppressing excessive restrictions on electric power output from the fuel cell.

In addition, the fuel cell system may further include: an operating state regulating unit that is configured to include at least one of a humidifying unit that controls a humidification amount of reaction gas supplied to the fuel cell in order to regulate a wet state inside the fuel cell and a refrigerant supply unit that controls a flow rate of refrigerant supplied to the fuel cell in order to regulate an operating temperature of the fuel cell; and a correlation changing unit that is configured to change the correlation in response to at least one of the wet state inside the fuel cell and the operating temperature of the fuel cell, wherein, when a current density corresponding to an output current required from the external load in a period during which negative voltage is generated in the at least one power generating element is larger than a predetermined value, the control unit may be configured to cause the operating state regulating unit to regulate at least one of the wet state inside the fuel cell and the operating temperature of the fuel cell so as to expand the operation allowable range in such a manner that the correlation is changed by the correlation changing unit. With the above fuel cell system, even when current required for the fuel cell falls outside the operation allowable range of the fuel cell, the required current may fall within the operation allowable range in such a manner that at least one of the wet state inside the fuel cell and the operating temperature of the fuel cell is regulated to expand the operation allowable range.

In addition, in the fuel cell system, when the output restricting process is completed, the control unit may be configured to nonvolatily store an accumulated current value of current output from the fuel cell in the output restricting process, and, when the output restricting process is resumed, the control unit may be configured to execute the output restricting process using a total accumulated current value that is obtained by adding the stored accumulated current value and an accumulated current value of current output from the fuel cell after the output restricting process is resumed. With the above fuel cell system, even when the current restricting process is executed again after a restart of the fuel cell system, the current restricting process is executed using the total accumulated current value that is accumulated from the recorded accumulated current value.

In addition, the fuel cell system may further include a warning unit that is configured to warn a user of degradation of the fuel cell, wherein the control unit may be configured to prestore a lower limit value of the current density of the fuel cell, and, when the current density of the fuel cell is lower than the lower limit value in the output restricting process, the control unit may be configured to cause the warning unit to warn the user of degradation of the fuel cell. With the above fuel cell system, when the fuel cell has not recovered from negative voltage but the preset lower limit value of the current density of the fuel cell has been reached during the output restricting process, the user is warned of degradation of the fuel cell. Thus, the user is able to appropriately know the timing at which the fuel cell should be maintained.

In addition, the fuel cell system may further include: a refrigerant supply unit that is configured to supply refrigerant to the fuel cell to control a temperature of the fuel cell; and a temperature measuring unit that is configured to measure an operating temperature of the fuel cell, wherein, in the output restricting process, the control unit may be configured to obtain an estimated heat value that is a heat value of the fuel cell when the fuel cell is caused to output electric power at a current density based on a current density command value to the fuel cell, and to control an amount of the refrigerant supplied to the fuel cell by the refrigerant supply unit on the basis of the operating temperature measured by the temperature measuring unit and the estimated heat value. With the above fuel cell system, even when electric power output from the fuel cell is restricted by executing the output restricting process, the flow rate of supplied refrigerant is appropriately controlled, so an increase in operating temperature of the fuel cell while the output restricting process is executed is facilitated. Thus, it is highly likely that the fuel cell recovers from the negative voltage state.

In addition, in the fuel cell system, in the output restricting process, the control unit may be configured to use the estimated heat value and the operating temperature measured by the temperature measuring unit to calculate an estimated temperature increase of the fuel cell when the fuel cell is caused to output electric power for a predetermined period of time while the fuel cell is being supplied with refrigerant, and, when the estimated temperature increase is smaller than or equal to a preset threshold, the control unit may be configured to cause the fuel cell to generate electric power in a state where the refrigerant supply unit is caused to stop supply of the refrigerant to the fuel cell. With the above fuel cell system, when it is difficult to bring the operating temperature of the fuel cell to a target value because electric power output from the fuel cell is restricted through the output restricting process, supply of refrigerant to the fuel cell is stopped. Thus, an increase in temperature of the fuel cell while the output restricting process is executed is facilitated, so it is highly likely that the fuel cell recovers from the negative voltage state.

In addition, in the fuel cell system, in the output restricting process, when a rate of increase in the operating temperature of the fuel cell is lower than a preset threshold, the control unit may be configured to cause the fuel cell to generate electric power in a state where the refrigerant supply unit is caused to stop supply of the refrigerant to the fuel cell. With the above fuel cell system, when the rate of increase in temperature of the fuel cell has not reached a target value according to the measured operating temperature of the fuel cell while the output restricting process is executed, supply of refrigerant to the fuel cell is stopped. Thus, an increase in temperature of the fuel cell while the output restricting process is executed is facilitated, so it is highly likely that the fuel cell recovers from the negative voltage state.

Yet further another aspect of the invention provides a control method for a fuel cell system that outputs electric power generated by a fuel cell having at least one power generating element in response to a request from an external load. The control method includes: measuring an accumulated current value that is obtained by time integration of current output from the fuel cell in a period during which a preset environmental condition that indicates a possibility that negative voltage is generated in the at least one power generating element is satisfied; consulting a preset correlation between accumulated current values that are allowable in a period during which negative voltage is generated in the at least one power generating element and current densities that are allowable in the period; and executing output restricting process of restricting electric power output from the fuel cell so as to fall within an operation allowable range defined by the allowable accumulated current values and allowable current densities of the correlation.

Note that the aspects of the invention may be implemented in various forms, and, for example, may be implemented in a form, such as a fuel cell system, a vehicle equipped with the fuel cell system, a control method for the fuel cell system, a computer program for implementing the functions of those system, vehicle and control method, and a recording medium that records the computer program.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4A, FIG. 4B and FIG. 4C are graphs for illustrating performance deterioration of the fuel cell due to negative voltage generated because of poor hydrogen supply in the fuel cell system;

FIG. 9 is a schematic view that shows the electrical configuration of a fuel cell system according to a first alternative embodiment to the first embodiment;

DETAILED DESCRIPTION OF EMBODIMENTS

Figure 1:
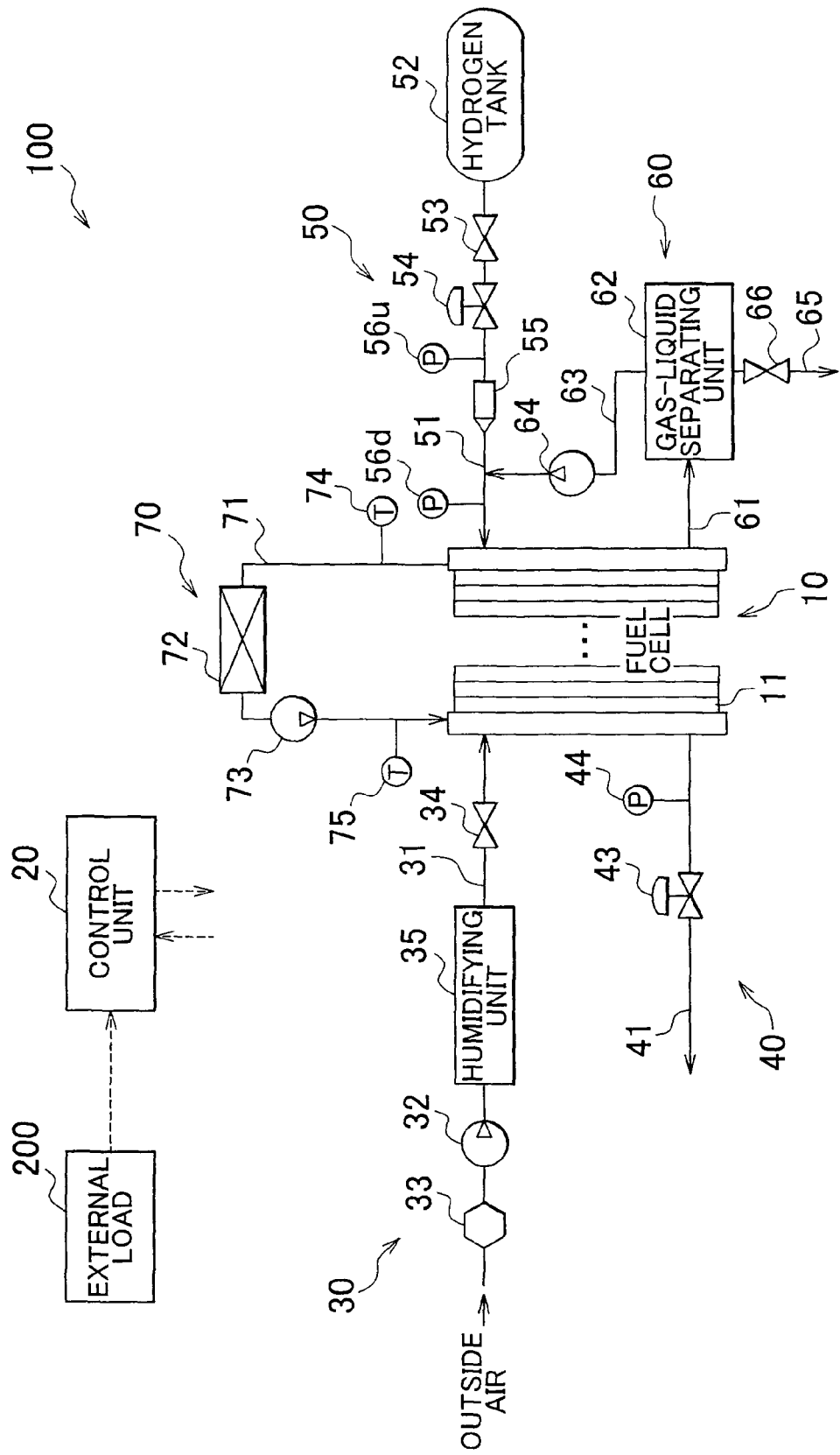
FIG. 1 is a schematic view that shows the configuration of a fuel cell system according to a first embodiment of the invention.

FIG. 1 is a schematic view that shows the configuration of a fuel cell system according to a first embodiment of the invention. The fuel cell system 100 includes a fuel cell 10, a control unit 20, a cathode gas supply unit 30, a cathode gas exhaust unit 40, an anode gas supply unit 50, an anode gas circulation exhaust unit 60 and a refrigerant supply unit 70.

The fuel cell 10 is a polymer electrolyte fuel cell that is supplied with hydrogen (anode gas) and air (cathode gas) as reaction gases to generate electric power. The fuel cell 10 has a stack structure in which a plurality of power generating elements 11 called single cells are stacked. Each power generating element 11 includes a membrane electrode assembly (not shown) and two separators (not shown). The membrane electrode assembly is the power generating element in which electrodes are arranged on both surfaces of an electrolyte membrane. The two separators sandwich the membrane electrode assembly.

Here, the electrolyte membrane may be formed of a solid polymer thin film that exhibits favorable proton conductivity in a wet state. In addition, each electrode may be formed of carbon (C). Note that a surface of the electrode, facing the electrolyte membrane, supports a catalyst (for example, platinum (Pt)) for facilitating power generation reaction. Manifolds (not shown) for reaction gases and refrigerant are provided for each power generating element 11. Reaction gases in the manifolds are supplied to the power generating portion of each power generating element 11 via the respective gas flow passages provided for each power generating element 11.

The control unit 20 is formed of a microcomputer that includes a central processing unit and a main storage. The control unit 20 accepts an output power request from an external load 200. In response to the request, the control unit 20 controls structural units of the fuel cell system 100 described below to cause the fuel cell 10 to generate electric power.

The cathode gas supply unit 30 includes a cathode gas line 31, an air compressor 32, an air flow meter 33, an on-off valve 34 and a humidifying unit 35. The cathode gas line 31 is connected to the cathode of the fuel cell 10. The air compressor 32 is connected to the fuel cell 10 via the cathode gas line 31. The air compressor 32 takes in and compresses outside air, and supplies the compressed air to the fuel cell 10 as cathode gas.

The air flow meter 33 measures the flow rate of outside air taken in by the air compressor 32 at a portion upstream of the air compressor 32 and then transmits the measured flow rate to the control unit 20. The control unit 20 drives the air compressor 32 on the basis of the measured flow rate to control the amount of air supplied to the fuel cell 10.

The on-off valve 34 is provided between the air compressor 32 and the fuel cell 10. The on-off valve 34 opens or closes in response to flow of supplied air in the cathode gas line 31. Specifically, the on-off valve 34 is normally closed, and opens when air having a predetermined pressure is supplied from the air compressor 32 to the cathode gas line 31.

The humidifying unit 35 humidifies high-pressure air pumped from the air compressor 32. In order to keep a wet state of the electrolyte membranes to obtain favorable proton conductivity, the control unit 20 uses the humidifying unit 35 to control the humidification amount of air supplied to the fuel cell 10 to thereby regulate the wet state inside the fuel cell 10.

The cathode gas exhaust unit 40 includes a cathode exhaust gas line 41, a pressure regulating valve 43 and a pressure measuring unit 44. The cathode exhaust gas line 41 is connected to the cathode of the fuel cell 10, and exhausts cathode exhaust gas to the outside of the fuel cell system 100. The pressure regulating valve 43 regulates the pressure of cathode exhaust gas (back pressure of the fuel cell 10) in the cathode exhaust gas line 41. The pressure measuring unit 44 is provided at a portion upstream of the pressure regulating valve 43. The pressure measuring unit 44 measures the pressure of cathode exhaust gas, and then transmits the measured pressure to the control unit 20. The control unit 20 regulates the opening degree of the pressure regulating valve 43 on the basis of the pressure measured by the pressure measuring unit 44.

The anode gas supply unit 50 includes an anode gas line 51, a hydrogen tank 52, an on-off valve 53, a regulator 54, an injector 55 and two pressure measuring units 56u and 56d. The hydrogen tank 52 is connected to the anode of the fuel cell 10 via the anode gas line 51, and supplies hydrogen filled in the tank to the fuel cell 10. Note that the fuel cell system 100 may include a reforming unit instead of the hydrogen tank 52 as a hydrogen supply source. The reforming unit reforms hydrocarbon-based fuel to produce hydrogen.

The on-off valve 53, the regulator 54, the first pressure measuring unit 56u, the injector 55 and the second pressure measuring unit 56d are provided in the anode gas line 51 from the upstream side (side adjacent to the hydrogen tank 52) in the stated order. The on-off valve 53 opens or closes in response to a command from the control unit 20. The on-off valve 53 controls flow of hydrogen from the hydrogen tank 52 toward the upstream side of the injector 55. The regulator 54 is a pressure reducing valve for regulating the pressure of hydrogen at a portion upstream of the injector 55. The opening degree of the regulator 54 is controlled by the control unit 20.

The injector 55 is an electromagnetically driven on-off valve of which the valve element is electromagnetically driven in accordance with a driving interval or valve open duration set by the control unit 20. The control unit 20 controls the driving interval or valve open duration of the injector 55 to control the amount of hydrogen supplied to the fuel cell 10. The first and second pressure measuring units 56u and 56d respectively measure the pressure of hydrogen at a portion upstream of the injector 55 and the pressure of hydrogen at a portion downstream of the injector 55, and then transmit the measured pressures to the control unit 20. The control unit 20 uses these measured pressures to determine the driving interval or valve open duration of the injector 55.

The anode gas circulation exhaust unit 60 includes an anode exhaust gas line 61, a gas-liquid separating unit 62, an anode gas circulation line 63, a hydrogen circulation pump 64, an anode drain line 65 and a drain valve 66. The anode exhaust gas line 61 connects the outlet of the anode of the fuel cell 10 to the gas-liquid separating unit 62. The anode exhaust gas line 61 leads anode exhaust gas that includes unreacted gas (hydrogen, nitrogen, and the like) that is not used in power generation reaction to the gas-liquid separating unit 62.

The gas-liquid separating unit 62 is connected to the anode gas circulation line 63 and the anode drain line 65. The gas-liquid separating unit 62 separates gas components and water content included in anode exhaust gas. The gas-liquid separating unit 62 leads the gas components to the anode gas circulation line 63, and leads the water content to the anode drain line 65.

The anode gas circulation line 63 is connected to the anode gas line 51 at a portion downstream of the injector 55. The hydrogen circulation pump 64 is provided in the anode gas circulation line 63. Hydrogen included in the gas components separated by the gas-liquid separating unit 62 is pumped to the anode gas line 51 by the hydrogen circulation pump 64. In this way, in the fuel cell system 100, hydrogen included in anode exhaust gas is circulated and supplied again to the fuel cell 10 to thereby improve the usage efficiency of hydrogen.

The anode drain line 65 is used to drain the water content separated by the gas-liquid separating unit 62 to the outside of the fuel cell system 100. The drain valve 66 is provided in the anode drain line 65. The drain valve 66 opens or closes in response to a command from the control unit 20. The control unit 20 normally closes the drain valve 66 during operation of the fuel cell system 100, and opens the drain valve 66 at a predetermined drain timing set in advance or a timing at which inert gas included in anode exhaust gas is exhausted.

The refrigerant supply unit 70 includes a refrigerant line 71, a radiator 72, a refrigerant circulation pump 73 and two refrigerant temperature measuring units 74 and 75. The refrigerant line 71 connects a refrigerant inlet manifold to a refrigerant outlet manifold. The refrigerant inlet manifold and the refrigerant outlet manifold are provided for the fuel cell 10. The refrigerant line 71 circulates refrigerant for cooling the fuel cell 10. The radiator 72 is provided in the refrigerant line 71. The radiator 72 exchanges heat between refrigerant flowing in the refrigerant line 71 and outside air to thereby cool the refrigerant.

The refrigerant circulation pump 73 is provided in the refrigerant line 71 at a portion downstream of the radiator 72 (adjacent to the refrigerant inlet of the fuel cell 10). The refrigerant circulation pump 73 pumps refrigerant cooled by the radiator 72 to the fuel cell 10. The two refrigerant temperature measuring units 74 and 75 are respectively provided near the refrigerant outlet of the fuel cell 10 and near the refrigerant inlet of the fuel cell 10 in the refrigerant line 71. The two refrigerant temperature measuring units 74 and 75 respectively transmit the measured temperatures to the control unit 20. The control unit 20 detects the operating temperature of the fuel cell 10 from a difference between the respective temperatures measured by the two refrigerant temperature measuring units 74 and 75, and then controls the amount of refrigerant pumped by the refrigerant circulation pump 73 on the basis of the detected operating temperature to thereby regulate the operating temperature of the fuel cell 10.

Figure 2:
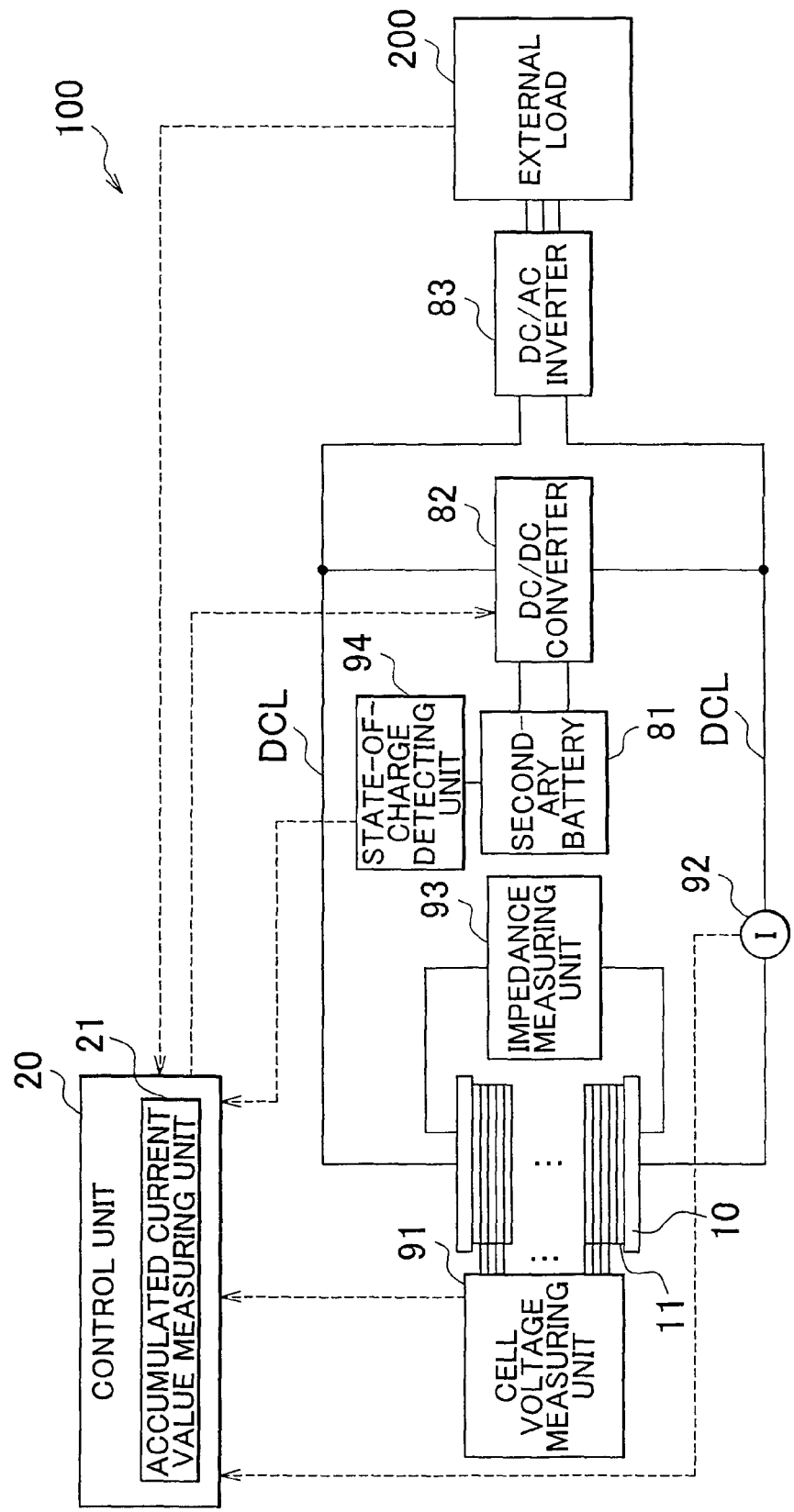
FIG. 2 is a schematic view that shows the electrical configuration of the fuel cell system according to the first embodiment of the invention.

FIG. 2 is a schematic view that shows the electrical configuration of the fuel cell system 100. The fuel cell system 100 includes a secondary battery 81, a DC/DC converter 82 and a DC/AC inverter 83. In addition, the fuel cell system 100 includes a cell voltage measuring unit 91, a current measuring unit 92, an impedance measuring unit 93 and a state-of-charge detecting unit 94.

The fuel cell 10 is connected to the DC/AC inverter 83 via a direct current power supply line DCL. The secondary battery 81 is connected to the direct current power supply line DCL via the DC/DC converter 82. The DC/AC inverter 83 is connected to the external load 200. Note that, in the fuel cell system 100, part of electric power output from the fuel cell 10 and the secondary battery 81 is used to drive auxiliaries that constitute the fuel cell system 100; however, wiring for the auxiliaries is not shown and the description thereof is omitted.

The secondary battery 81 functions as an auxiliary power supply of the fuel cell 10. The secondary battery 81 may be, for example, formed of a chargeable and dischargeable lithium ion battery. The DC/DC converter 82 functions as a charge/discharge control unit that controls charging/discharging of the secondary battery 81. The DC/DC converter 82 variably regulates the voltage level of the direct current power supply line DCL in response to a command from the control unit 20. If electric power output from the fuel cell 10 is insufficient for an output request from the external load 200, the control unit 20 instructs the DC/DC converter 82 to discharge the secondary battery 81 in order to compensate for the insufficient electric power.

The DC/AC inverter 83 converts direct current electric power obtained from the fuel cell 10 and the secondary battery 81 to alternating current electric power, and then supplies the alternating current electric power to the external load 200. Note that, when regenerative electric power is generated in the external load 200, the regenerative electric power is converted to direct current electric power by the DC/AC inverter 83, and then the secondary battery 81 is charged with the direct current electric power by the DC/DC converter 82.

The cell voltage measuring unit 91 is connected to each power generating element 11 of the fuel cell 10 to measure the voltage (cell voltage) of each power generating element 11. The cell voltage measuring unit 91 transmits the measured cell voltages to the control unit 20. Note that the cell voltage measuring unit 91 may transmit only the lowest cell voltage among the measured cell voltages to the control unit 20.

The current measuring unit 92 is connected to the direct current power supply line DCL. The current measuring unit 92 measures the current output from the fuel cell 10, and then transmits the measured current to the control unit 20. The state-of-charge detecting unit 94 is connected to the secondary battery 81. The state-of-charge detecting unit 94 detects the state of charge (SOC) of the secondary battery 81, and then transmits the detected SOC to the control unit 20.

The impedance measuring unit 93 is connected to the fuel cell 10. The impedance measuring unit 93 applies alternating current to the fuel cell 10 to thereby measure the impedance of the fuel cell 10. Here, it is known that the impedance of the fuel cell 10 varies with the amount of water content present inside the fuel cell 10. That is, the correlation between the impedance of the fuel cell 10 and the amount of water content (humidity) inside the fuel cell 10 is acquired in advance, and then the impedance of the fuel cell 10 is measured to thereby make it possible to obtain the amount of water content (humidity) inside the fuel cell 10.

Incidentally, in the fuel cell system 100 according to the first embodiment, the control unit 20 also functions as an accumulated current value measuring unit 21. The accumulated current value measuring unit 21 integrates current output from the fuel cell 10, measured by the current measuring unit 92, with respect to time for a predetermined period of time to thereby calculate an accumulated current value that indicates the electric charge output from the fuel cell 10. The control unit 20 uses the accumulated current value to execute current restricting process for suppressing deterioration of the power generation performance of the power generating elements 11, and the detailed description thereof will be described later.

Figure 3A:
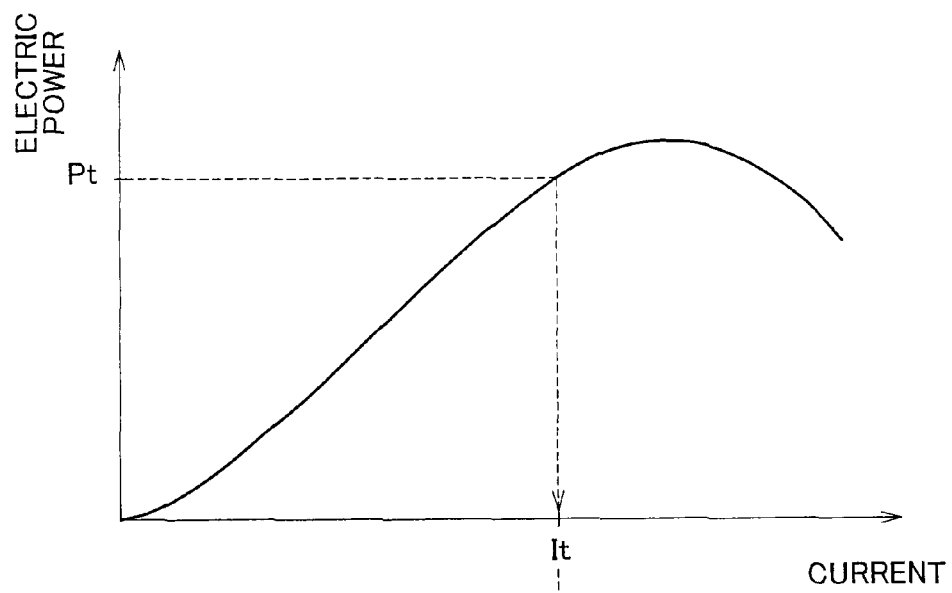
FIG. 3A and FIG. 3B are graphs for illustrating output control over a fuel cell of the fuel cell system according to the first embodiment of the invention.
Figure 3B:
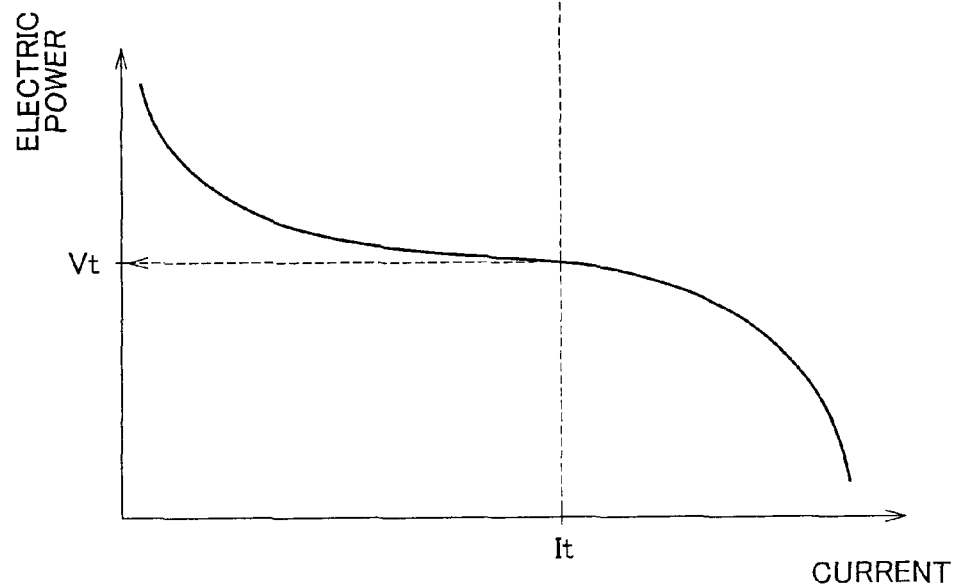

FIG. 3A and FIG. 3B are graphs for illustrating output control over the fuel cell 10 of the fuel cell system 100. FIG. 3A is a graph that shows the W-I characteristics of the fuel cell 10, in which the ordinate axis represents the electric power of the fuel cell 10 and the abscissa axis represents the current of the fuel cell 10. Generally, the W-I characteristics of a fuel cell are shown by an upward-convex curve.

FIG. 3B is a graph that shows the V-I characteristics of the fuel cell 10, in which the ordinate axis represents the voltage of the fuel cell 10 and the abscissa axis represents the current of the fuel cell 10. Generally, the V-I characteristics of a fuel cell are shown by a horizontal sigmoid curve that declines with an increase in current. Note that, in FIG. 3A and FIG. 3B, the abscissa axes of the respective graphs correspond to each other.

The control unit 20 prestores these W-I characteristics and V-I characteristics of the fuel cell 10. The control unit 20 uses the W-I characteristics to acquire a target current It that should be output from the fuel cell 10 for an electric power Pt required from the external load 200. In addition, the control unit 20 uses the V-I characteristics to determine a target voltage Vt of the fuel cell 10 for outputting the target current It obtained from the W-I characteristics. The control unit 20 sets the target voltage Vt in the DC/DC converter 82 to cause the DC/DC converter 82 to regulate the voltage of the direct current power supply line DCL.

Incidentally, as described above, in the fuel cell 10, reaction gases flow from the manifolds into the gas flow passages of each power generating element 11. However, the gas flow passages of each power generating element 11 may possibly be blocked by water content, or the like, produced in the fuel cell 10. If the fuel cell 10 is caused to continue power generation in a state where the gas passages of part of the power generating elements 11 are blocked, power generation reaction is suppressed because of insufficient supply of reaction gases in the part of the power generating elements 11. On the other hand, the other power generating elements 11 continue power generation, so the part of the power generating elements 11 work as resistance in the fuel cell 10 to thereby generate negative voltage. Hereinafter, in the specification, the power generating element 11 in which negative voltage is generated is termed a "negative voltage cell 11".

It is known that, as the negative voltage state of each negative voltage cell 11 continues, degradation of the electrodes of each negative voltage cell 11 progresses and then the power generation performance of the fuel cell 10 deteriorates. Here, negative voltage occurs because of poor hydrogen supply that is caused through inhibition of supply of hydrogen to the anode or because of poor oxygen supply that is caused through inhibition of supply of oxygen to the cathode. In the case of occurrence of negative voltage due to poor supply of hydrogen to the anode, the performance of the fuel cell 10 deteriorates as follows depending on the level of negative voltage.

FIG. 4A to FIG. 4C are graphs for illustrating performance deterioration of the fuel cell 10 due to negative voltage generated through poor hydrogen supply in any one of the power generating elements 11. FIG. 4A is a graph that shows a variation in cell voltage when negative voltage is generated in any one of the power generating elements 11. In the graph of FIG. 4A, the ordinate axis represents the cell voltage and the abscissa axis represents time.

In the graph, negative voltage occurs at time $t_0$, and the cell voltage declines substantially vertically to the voltage $V_1$. After that, the cell voltage is maintained constant around the voltage $V_1$, declines substantially vertically to the voltage $V_2$ again at time $t_1$, and is then maintained substantially constant at the voltage $V_2$. In this way, the level of negative voltage that is generated through poor hydrogen supply decreases in two stages in a substantially stepwise manner with a lapse of time.

Here, in the anode of each negative voltage cell 11, protons are produced by the following chemical reaction in order to compensate for poor hydrogen supply. That is, protons are produced by water-splitting reaction expressed by the following reaction formula (1) during a period from time $t_0$ to time $t_1$, and protons are produced by oxidation reaction of carbon that constitutes the electrode (anode), expressed by the following reaction formula (2), after time $t_2$.

$$2H_2O \rightarrow O_2 + 4H^+ + e^- \quad (1)$$

$$C + 2H_2O \rightarrow CO_2 + 4H^+ + 4e^- \quad (2)$$

FIG. 4B shows a graph that shows the power generation performance of each negative voltage cell 11 during a period from time $t_0$ to time $t_1$. FIG. 4C shows a graph that shows the power generation performance of each negative voltage cell 11 after time $t_1$. FIG. 4B and FIG. 4C each include a graph $G_{I-V}$ that shows the I-V characteristics of each negative voltage cell 11, in which the abscissa axis represents current density and the ordinate axis represents cell voltage and a graph $G_{I-R}$ that shows the I-R characteristics of each negative voltage cell 11, in which the abscissa axis represents current density and the ordinate axis represents resistance. Note that, in order to show changes in characteristics, in FIG. 4C, the graphs $G_{I-V}$ and $G_{I-R}$ shown in FIG. 4B are indicated by the broken lines, and the arrows that indicate directions in which the respective graphs shift are shown.

In this way, if water-splitting reaction is occurring in the anode of each negative voltage cell 11 as in the case during a period from time $t_0$ to time $t_1$, deterioration of the power generation performance of the fuel cell 10 is relatively suppressed (FIG. 4B). Note that, in the case of FIG. 4B, the I-V characteristics of each power generating element 11 in which no negative voltage is generated substantially coincide with the I-V characteristics of each negative voltage cell 11. On the other hand, if carbon oxidation reaction is occurring in the anode of each negative voltage cell 11 as in the case after time $t_1$, the I-V characteristics of each negative voltage cell 11 decrease, and the internal resistance of each negative voltage cell 11 increases (FIG. 4C). Note that the power generation performance of the fuel cell 10 deteriorates because of performance deterioration of each negative voltage cell 11. In addition, if the carbon of the electrode is oxidized as in the case after time $t_1$, it is difficult to recover the power generation performance of each negative voltage cell 11 even after a restart of the fuel cell 10.

Hereinafter, in the specification, the level of negative voltage at which power generation may be continued while suppressing deterioration of the power generation performance of the fuel cell 10 through water-splitting reaction in the anode of each negative voltage cell 11 as in the case during a period from time $t_0$ to time $t_1$ is termed a "power generation allowable level". In addition, the level of negative voltage at which degradation of the electrode of each negative voltage cell 11 occurs and the power generation performance of the fuel cell 10 deteriorates as in the case after time $t_1$ is termed a "performance deterioration level".

In the fuel cell system 100 according to the first embodiment, when negative voltage has been detected in any one of the power generating elements 11 of the fuel cell 10, the negative voltage state is recovered through the negative voltage recovery process described below. Note that, in the negative voltage recovery process, when it is determined that negative voltage is due to poor hydrogen supply, output control that suppresses the level of negative voltage from reaching the performance deterioration level is executed to thereby recover from negative voltage while avoiding degradation of the electrode of the negative voltage cell 11.

Figure 5:
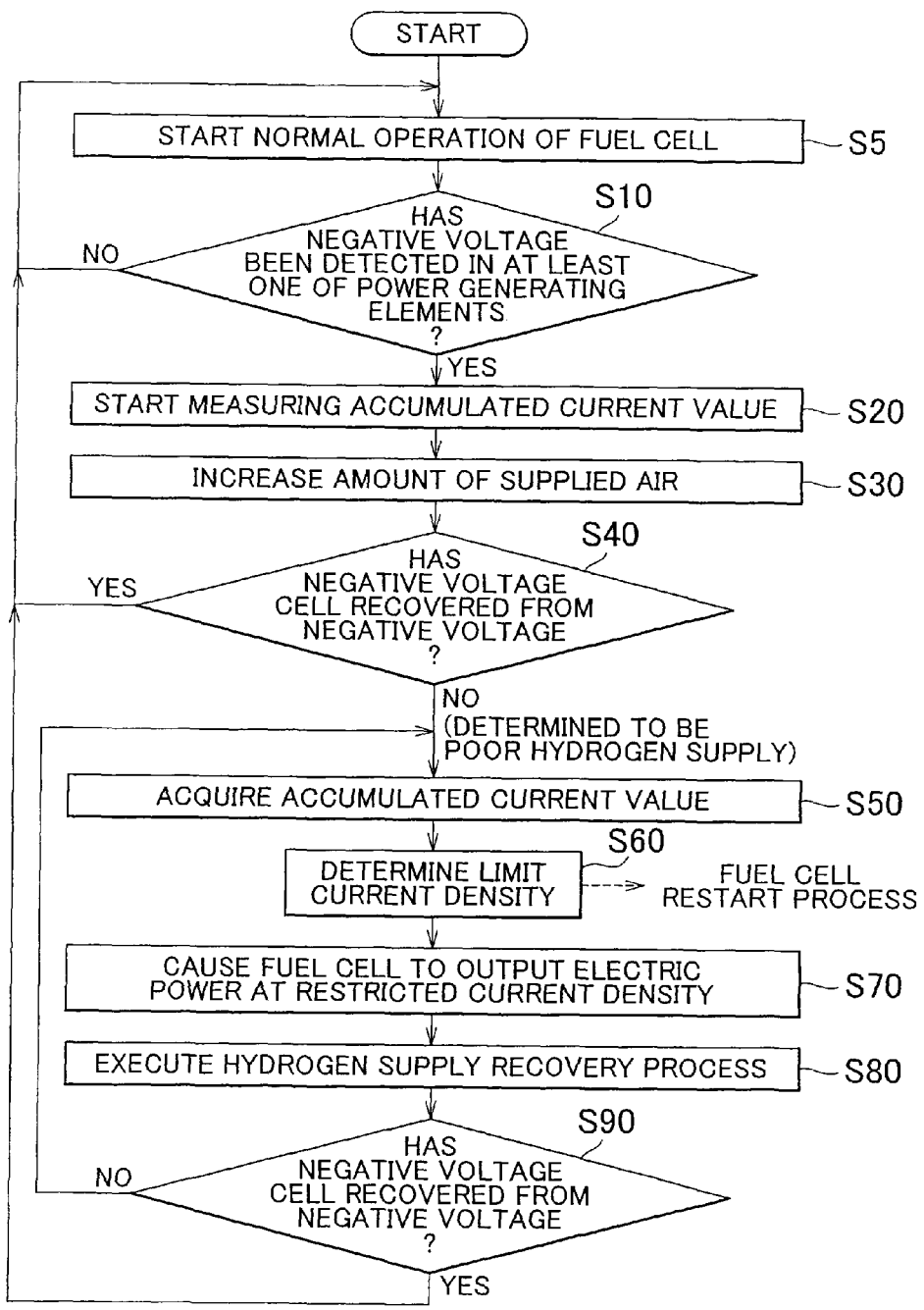
FIG. 5 is a flowchart for illustrating the procedure of a negative voltage recovery process in the fuel cell system.

FIG. 5 is a flowchart for illustrating the procedure of the negative voltage recovery process executed by the control unit 20. After normal operation of the fuel cell 10 (step S5) is started, when negative voltage has been detected in at least one of the power generating elements 11 by the cell voltage measuring unit 91, the control unit 20 starts the process in step S20 and the following steps (step S10). In step S20, the control unit 20 causes the accumulated current value measuring unit 21 to start measuring an accumulated current value used in a current restricting process (described later).

Here, at the stage where negative voltage has been detected in step S10, it is not determined whether the reason why negative voltage is generated is due to poor supply of hydrogen to the anode or due to poor supply of oxygen to the cathode. Then, in step S30, the control unit 20 initially increases the rotational speed of the air compressor 32 to increase the amount of air supplied to the fuel cell 10. If negative voltage is generated because of poor supply of oxygen to the cathode, this operation eliminates insufficient air supply and also scavenges water content that blocks the cathode-side gas flow passage to make it possible to remove the blockage.

If the voltage of the negative voltage cell 11 increases after the amount of supplied air is increased, the control unit 20 determines that the negative voltage cell 11 has recovered from negative voltage and then returns to normal operation control over the fuel cell 10 (step S40). On the other hand, if the negative voltage cell 11 has not recovered from negative voltage even with an increase in the amount of supplied air, the control unit 20 determines that the reason why negative voltage is generated is due to poor hydrogen supply, and then starts current restricting process for avoiding degradation of the electrode and deterioration of the power generation performance in step S50 and the following steps.

In step S50, the control unit 20 acquires the accumulated current value from the accumulated current value measuring unit 21 on the basis of current output from the fuel cell 10 in a period during which negative voltage is generated. In steps S60 and S70, the control unit 20 uses the accumulated current value acquired in step S50 to obtain a limit of electric power output from the fuel cell 10, and then causes the fuel cell 10 to output electric power within the limited range. By so doing, degradation of the electrode of each negative voltage cell 11 and deterioration of the power generation performance of the fuel cell 10 are suppressed. Here, before the specific detailed operations in steps S60 and S70 are described, the correlation between the accumulated current value and the limit of electric power output from the fuel cell 10 for avoiding oxidation of the electrode and deterioration of the power generation performance due to negative voltage, which was obtained through the experiment by the inventors of the invention, will be described.

Figure 6:
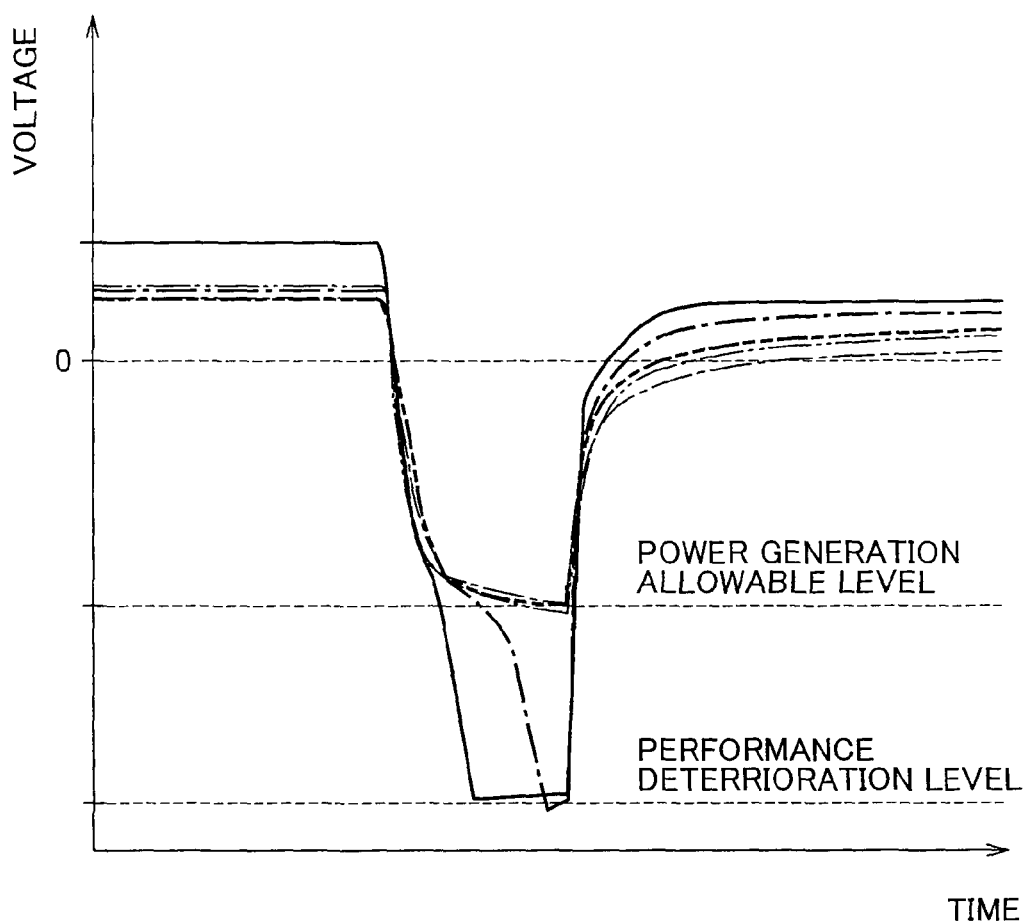
FIG. 6 is a graph for illustrating the timing at which the transition of negative voltage from power generation allowable level to performance deterioration level takes place in the fuel cell system.

FIG. 6 is a graph that shows the results of the experiment conducted by the inventors of the invention in order to investigate the timing at which the transition of negative voltage from the power generation allowable level to the performance deterioration level takes place. In the experiment, for selected one of the power generating elements 11, in a state where the anode-side gas flow passage is blocked, power generation that causes the fuel cell 10 to output a constant current at constant flow rates of reaction gases at a constant operating temperature was intermittently performed five times at a constant time interval. The graph of FIG. 6 shows a variation in negative voltage over time for each turn of power generation.

During the first to third power generations, the measuring time ended before negative voltage reaches the power generation allowable level. However, during the fourth power generation, the cell voltage decreased to the performance deterioration level in progress of measuring. Then, during the fifth power generation, the cell voltage decreased to the performance deterioration level immediately after power generation was started.

The inventors of the invention repeated a similar experiment with a different current output from the fuel cell 10, and found that an accumulated time that the transition of negative voltage from the power generation allowable level to the performance deterioration level takes place is substantially constant for each current density even when a stop and restart of power generation is repeated after negative voltage is generated. This is presumably because an oxidation film formed on the anode of the negative voltage cell 11 through water-splitting reaction is strong enough to remain even when power generation is stopped.

Then, it is presumable that the electric charge that can be output during a period from when negative voltage occurs to when negative voltage reaches the performance deterioration level is substantially constant for each current density and the electric charge output during then remains as the history of power generation during then. Through these findings, the inventors of the invention found that the operating condition that is allowable for the fuel cell 10 before the transition of negative voltage to the performance deterioration level takes place may be defined by the current density of the fuel cell 10 in a period during which negative voltage of the power generation allowable level is generated and the accumulated current value of the fuel cell 10 during then.

Figure 7:
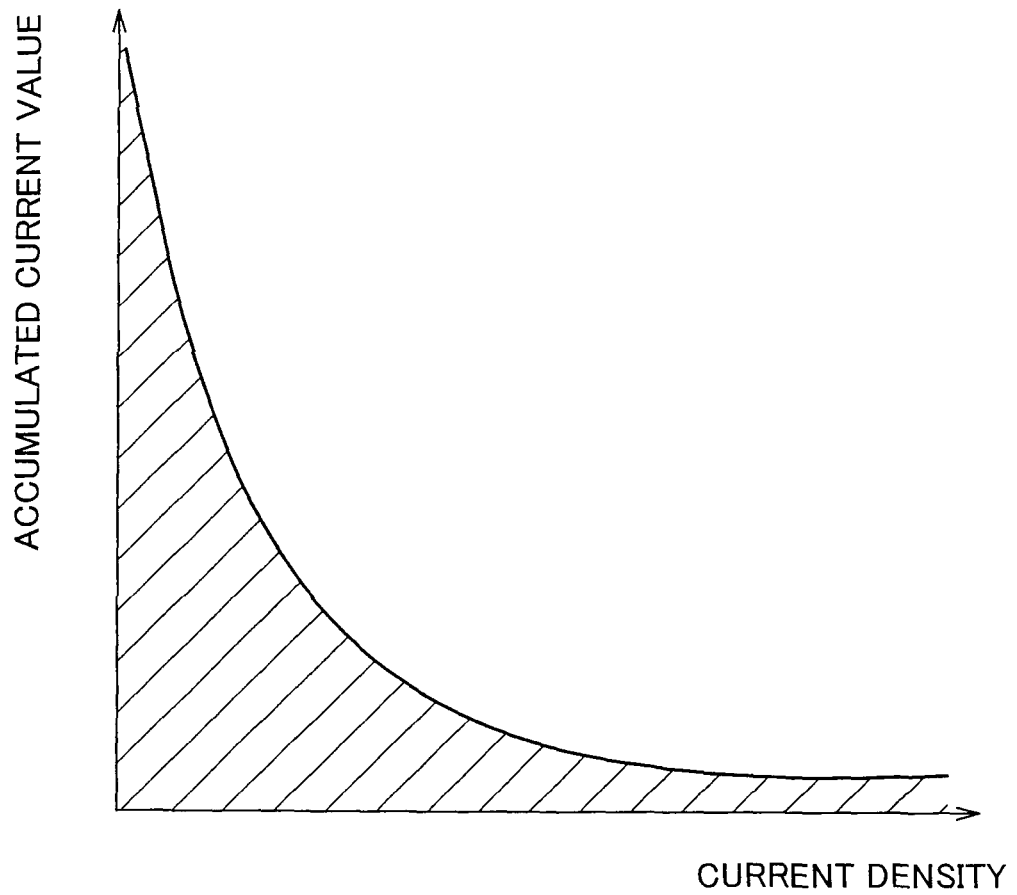
FIG. 7 is a graph for illustrating an operation allowable range of the fuel cell, defined through an experiment, in the fuel cell system.

FIG. 7 is a graph that shows the result of the experiment conducted by the inventors of the invention in order to define the operating condition allowable for the fuel cell 10 in a period during which negative voltage of the power generation allowable level is generated. In this experiment, the anode-side gas flow passage of any one of the power generating elements 11 was blocked, and then the accumulated current value when the fuel cell 10 is caused to continue power generation from when negative voltage occurs to when negative voltage reaches the performance deterioration level was measured. Then, the accumulated current value was measured with a different current density of the fuel cell 10 multiple times to obtain the current accumulated value for each current density. Note that, in this experiment, the flow rates of reaction gases supplied to the fuel cell 10 and the operating temperature of the fuel cell 10 were constant.

FIG. 7 is a graph that is obtained in such a manner that the ordinate axis represents an accumulated current value, the abscissa axis represents a current density and the measured results of the above experiment are plotted. In this way, the correlation between the current densities of the fuel cell 10 in a period during which negative voltage of the power generation allowable level is generated and the accumulated current values allowable for the fuel cell 10 during then is shown by a downward-convex decline curve. That is, as the current density of the fuel cell 10 in the period during which negative voltage of the power generation allowable level is generated (hereinafter, also referred to as "power generation allowable period") increases, the accumulated current value allowable for the fuel cell 10 during then reduces. The accumulated current value substantially exponentially reduces as the current density increases.

Here, in FIG. 7, the hatched range below the downward-convex curve may be understood as a range that includes a combination of the current density and the accumulated current value that are allowable for the fuel cell 10 during the power generation allowable period. Hereinafter, this range is termed an "operation allowable range". That is, in the case where negative voltage is generated because of poor hydrogen supply, when the fuel cell 10 is caused to output a combination of the current density and the accumulated current value that fall within the operation range, it is possible for the fuel cell 10 to continue power generation while avoiding negative voltage from reaching the performance deterioration level. Note that, as can be understood from the fact that the ordinate axis of the graph is an accumulated current value, the operation allowable range reduces with an increase in power generation duration of the fuel cell 10 after negative voltage occurs.

In the fuel cell system 100 according to the first embodiment, the control unit 20 prestores the correlation between the accumulated current values allowable for the fuel cell 10 and the current densities allowable for the fuel cell 10 in a period during which negative voltage is generated, shown by the graph of FIG. 7, as a map. Then, the map (hereinafter, referred to as "allowable range map") is used to execute current restricting process in steps S60 and S70 (FIG. 5).

Figure 8A:
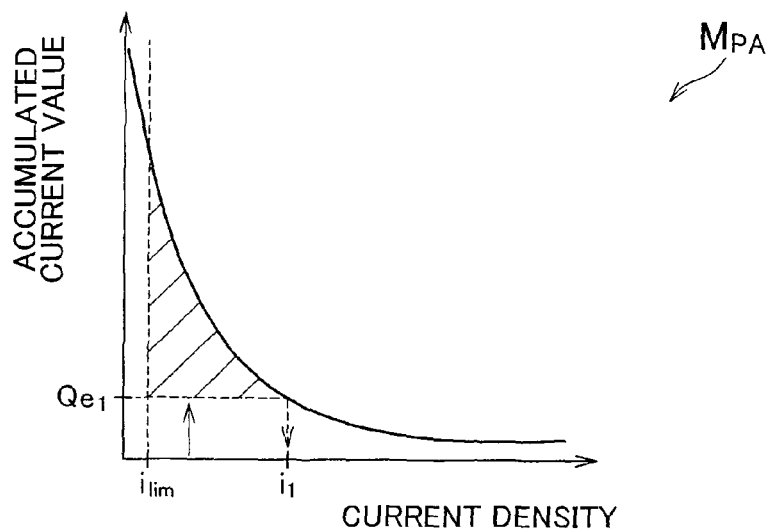
FIG. 8A, FIG. 8B and FIG. 8C are graphs for illustrating a current restricting process in the fuel cell system.
Figure 8B:
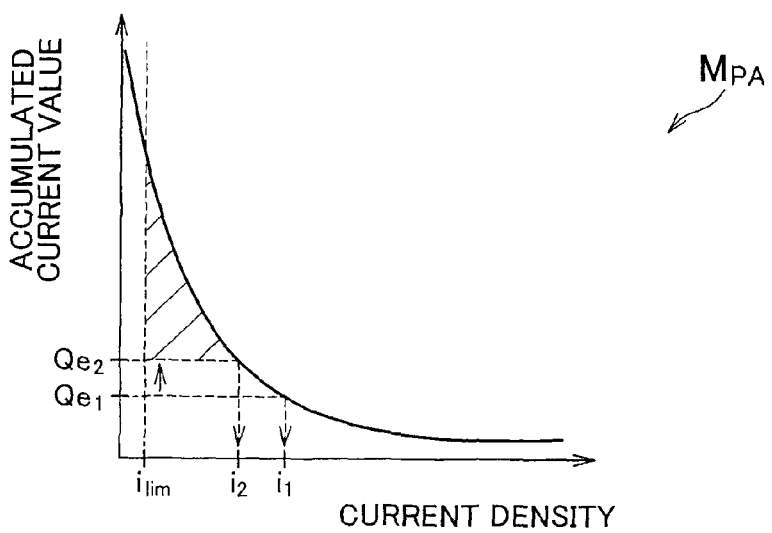
Figure 8C:
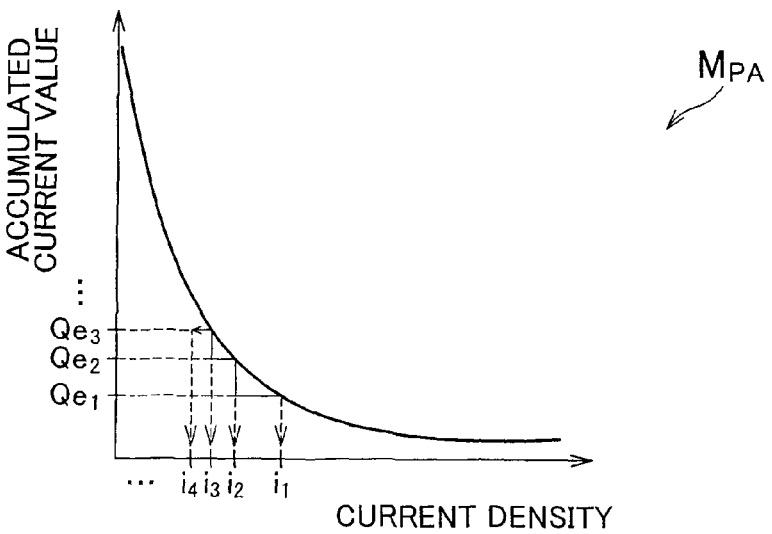

FIG. 8A to FIG. 8C are schematic graphs for illustrating processes in steps S60 and S70. In FIG. 8A to FIG. 8C, the above allowable range map $M_{PA}$ is shown by the graph of which the ordinate axis represents an accumulated current value and the abscissa axis represents a current density. In the graphs of the allowable range maps $M_{PA}$ in FIG. 8A and FIG. 8B, the operation allowable range is hatched. Here, in the fuel cell system 100 according to the first embodiment, a lower limit current density (also referred to as "minimum current density $i_{lim}$") that should be output from the fuel cell 10 is set in order for the control unit 20 to continue operation of the fuel cell system 100. Therefore, the range at or below the minimum current density $i_{lim}$ is not included in the operation allowable range.

In step S60, the control unit 20 acquires a current density $i_1$ for an accumulated current value $Qe_1$ acquired by the accumulated current value measuring unit 21 (FIG. 8A). Hereinafter, the current density acquired using the allowable range map $M_{PA}$ is also termed a "limit current density". Note that the accumulated current value $Qe_1$ at this time is obtained on the basis of current output from the fuel cell 10 during the processes of steps S20 to S60.

In step S70, the control unit 20 sets the limit current density $i_1$ obtained in step S60 as a current density that is currently allowable for the fuel cell 10, and then causes the fuel cell 10 to generate electric power at a current density $i_{1c}$ (also referred to as "restricted current density $i_{1c}$") that is smaller than the limit current density Specifically, the control unit 20 may subtract a preset value $\Delta i$ from the limit current density $i_1$ to calculate the restricted current density $i_{1c}$ ($i_{1c}=i_1-\Delta i$). Note that the preset value $\Delta i$ may vary depending on a limit current density. Specifically, it is also applicable that, as the limit current density reduces, the value $\Delta i$ is increased.

The operation allowable range in the allowable range map $M_{PA}$ is reduced by the accumulated current value $Qe_1$ in the ordinate axis direction, so, in step S70, when power generation is started at the restricted current density $i_{1c}$ that is smaller than the limit current density $i_1$, electric power output from the fuel cell 10 falls within the operation allowable range. Thus, it is possible to continue operation of the fuel cell 10 while avoiding degradation of the electrode.

Here, the control unit 20 starts the process for recovering from poor hydrogen supply in step S80 while current is restricted so as to be able to continue operation of the fuel cell 10. Specifically, it is also applicable that the flow rate of hydrogen supplied to the fuel cell 10 is increased by regulating the driving interval or valve open duration of the injector 55, increasing the rotational speed of the hydrogen circulation pump 64, or the like, to increase the pressure of hydrogen in the fuel cell 10.

Note that, when the fuel cell system 100 is placed under a low temperature environment, the gas flow passage of the anode may be blocked by frozen water content. Therefore, in this case, the process for increasing the temperature of the fuel cell 10 may be executed, for example, the rotational speed of the refrigerant circulation pump 73 is decreased.

After poor hydrogen supply recovery process in step S80 is started, when the negative voltage cell 11 still does not recover from negative voltage, the control unit 20 repeats current restricting process in steps S50 to S70 again (step S90). In step S50, as in the previous case, the control unit 20 acquires an accumulated current value $Qe_2$ on the basis of current output from the fuel cell 10 from when negative voltage has been detected to the current time (step S50). Then, the allowable range map $M_{PA}$ is used to acquire a limit current density $i_2$ corresponding to the accumulated current value $Qe_2$ (FIG. 8B). In step S70, the control unit 20 causes the fuel cell 10 to generate electric power at a restricted current density $i_{2c}$ that is smaller than the limit current density $i_2$.

FIG. 8C is a schematic graph for illustrating a variation in limit current density in the current restricting process. The current restricting process in steps S50 to S80 is repeatedly executed until the negative voltage cell 11 recovers from negative voltage (step S90). During repetition of the current restricting process, the limit current density reduces in a stepwise manner along the curve shown in the graph (arrows in the graph) with an increase in accumulated current value. In addition, current output from the fuel cell 10 reduces in a stepwise manner along the curve shown in the graph as in the case of the variation in limit current density. Note that, when the restricted current density acquired in step S60 is lower than or equal to the minimum current density $i_{lim}$, the control unit 20 determines that the negative voltage cell 11 has not recovered from negative voltage and the minimum electric power of the fuel cell 10 cannot be obtained, and then executes restart process of the fuel cell 10.

In this way, with the fuel cell system 100 according to the first embodiment, when it is determined in the negative voltage recovery process that the reason why negative voltage is generated is due to poor hydrogen supply, power generation is continued while suppressing a decrease in negative voltage to the performance deterioration level by means of the current restricting process. Then, during the current restricting process, the process for recovering from negative voltage is executed. Thus, it is possible to suppress deterioration of the power generation performance of the fuel cell 10 and degradation of the electrodes of the fuel cell 10 due to negative voltage.

Next, a first alternative embodiment to the first embodiment will be described. FIG. 9 is a schematic view that shows the electrical configuration of a fuel cell system 100a according to the first alternative embodiment to the first embodiment of the invention. FIG. 9 is substantially the same as FIG. 2 except that an accumulated current value recording unit 23 is added. Note that the other configuration of the fuel cell system 100a in this configuration example is similar to that of the fuel cell system 100 according to the first embodiment (FIG. 1). The accumulated current value recording unit 23 (FIG. 9) of the fuel cell system 100a is formed of a data erasable and rewritable nonvolatile memory, such as an erasable programmable read only memory (EPROM).

Figure 10:
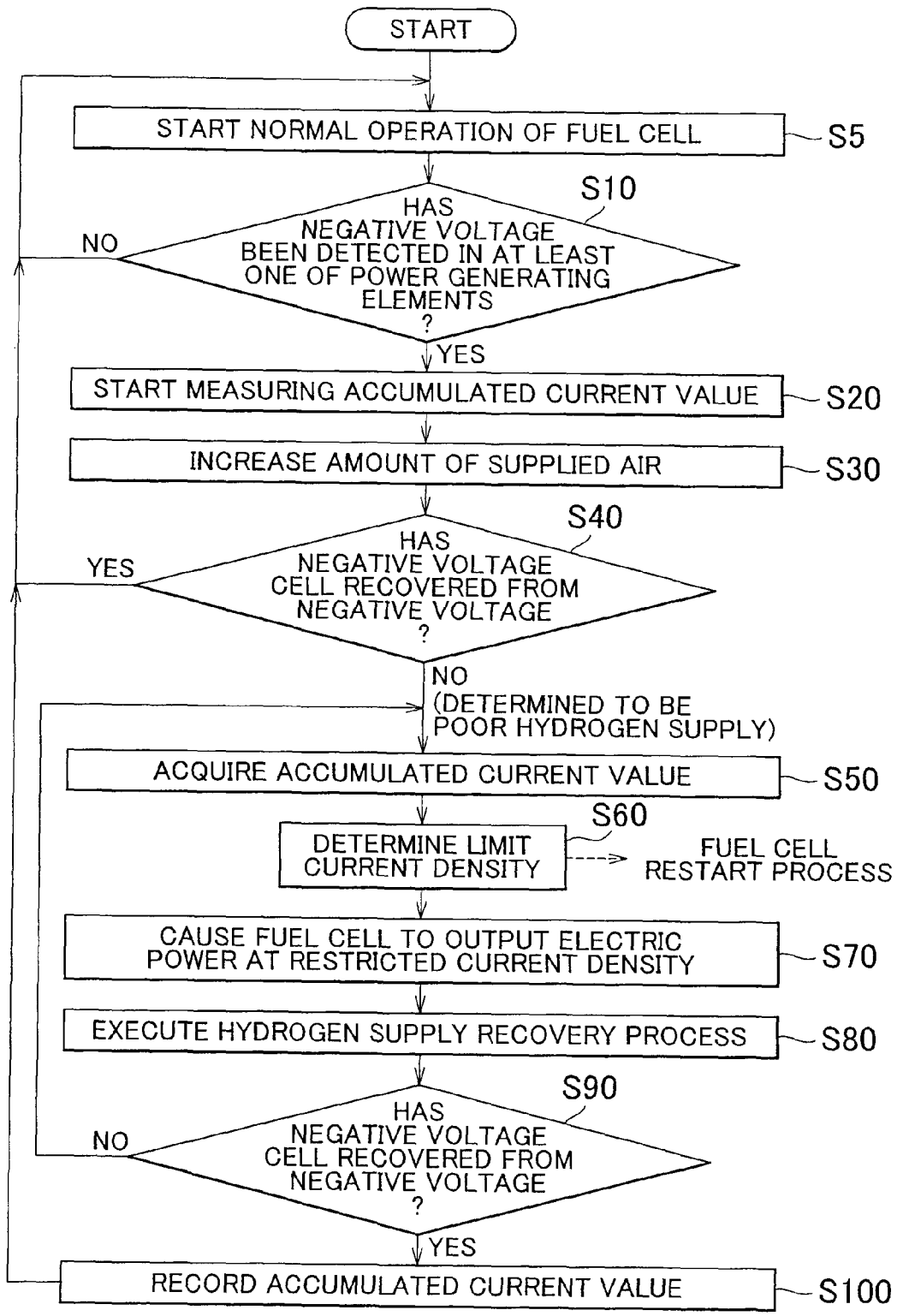
FIG. 10 is a flowchart for illustrating the procedure of a negative voltage recovery process according to the first alternative embodiment to the first embodiment.

FIG. 10 is a flowchart that shows the procedure of a negative voltage recovery process executed by the fuel cell system 100a. FIG. 10 is substantially the same as FIG. 5 except that step S100 is added after step S90. In the fuel cell system 100a, when negative voltage has been detected in the fuel cell 10, negative voltage recovery process is executed as in the case of the fuel cell system 100 according to the first embodiment. Then, in the negative voltage recovery process, when it is determined that the reason why negative voltage is generated is due to poor hydrogen supply, current restricting process similar to that described in the first embodiment is executed (steps S50 to S90).

When the negative voltage cell 11 has recovered from negative voltage during the current restricting process, the control unit 20 records the accumulated current value used in the current restricting process in the accumulated current value recording unit 23 (step S100). Here, it is assumed that the negative voltage cell 11 has recovered from negative voltage through the current restricting process. In such a case as well, unless maintenance of the power generating element 11 in which negative voltage has been generated is conducted, negative voltage is generated in that power generating element 11 again and then an operation allowable range when the current restricting process is started will be the operation allowable range at the time of the end of the previous current restricting process.

Then, in step S100, the control unit 20 nonvolatily records the accumulated current value in preparation for the next current restricting process. Here, the control unit 20 identifies the power generating elements 11 in which negative voltage is generated (negative voltage cells 11) at the time when negative voltage occurs, and records an accumulated current value in the accumulated current value recording unit 23 for the corresponding negative voltage cells 11.

When the current restricting process is executed again, the control unit 20 loads the accumulated current value that corresponds to each negative voltage cell 11 and that is recorded in the accumulated current value recording unit 23 as an initial value of the accumulated current value and then starts measuring the accumulated current value in step S20. That is, the control unit 20 execute the current restricting process using a total accumulated current value that is obtained by adding the accumulated current value recorded in the accumulated current value recording unit 23 and an accumulated current value of current output from the fuel cell 10 after the current restricting process is resumed. Note that, when the power generating element 11 that causes generation of negative voltage is maintained, the accumulated current value of the maintained power generating element 11, recorded in the accumulated current value recording unit 23, may be initialized.

Figure 11:
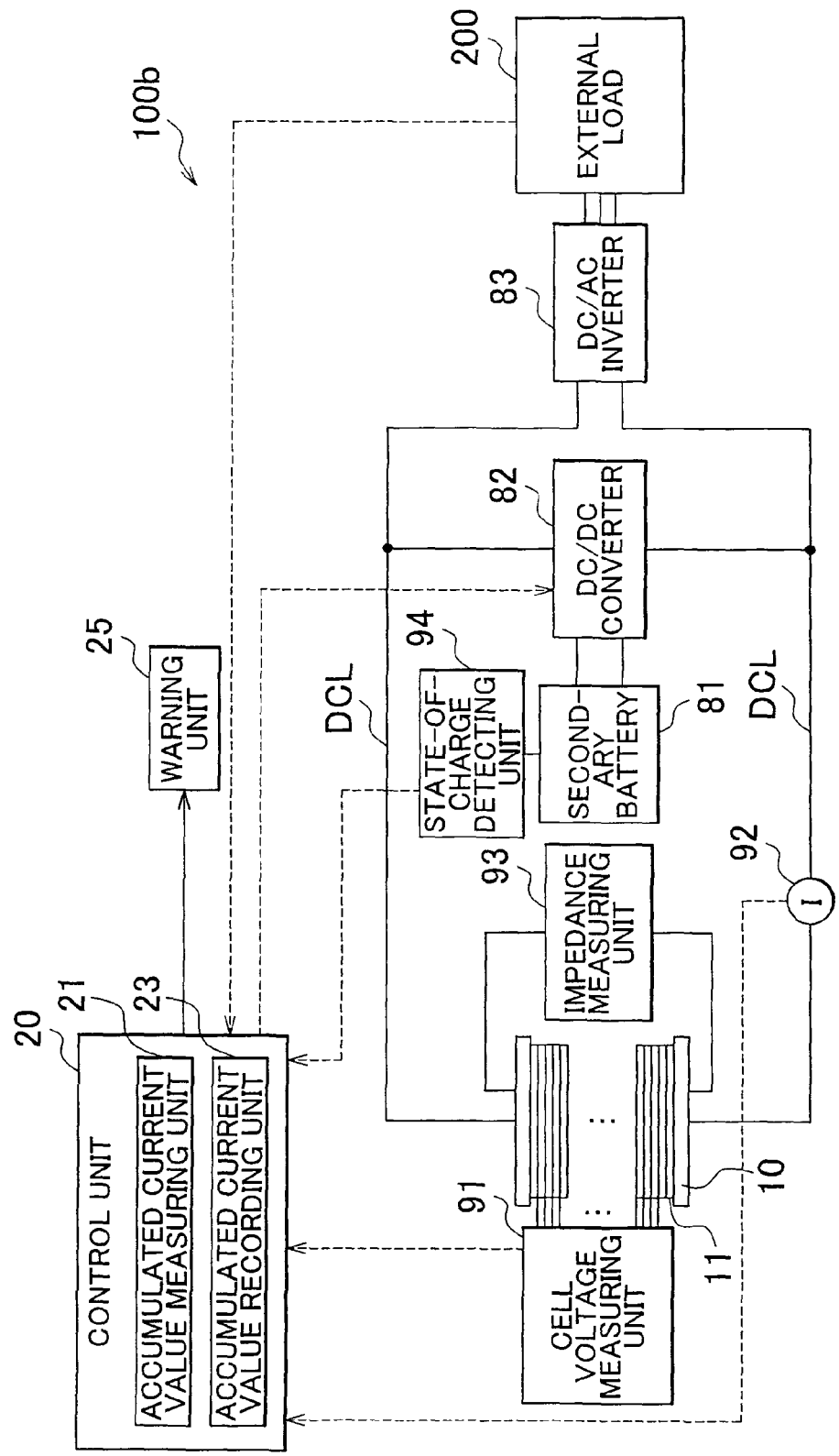
FIG. 11 is a schematic view that shows the electrical configuration of a fuel cell system according to a second alternative embodiment to the first embodiment.

Next, a second alternative embodiment to the first embodiment will be described. FIG. 11 is a schematic view that shows the configuration of a fuel cell system 100b according to the second alternative embodiment to the first embodiment of the invention. FIG. 11 is substantially the same as FIG. 9 except that a warning unit 25 is added. Note that the other configuration of the fuel cell system 100b in this configuration example is similar to that of the fuel cell system 100a in the first alternative embodiment (FIG. 9).

The warning unit 25 (FIG. 11) of the fuel cell system 100b visually or aurally warns a user of the fuel cell system 100b of maintenance of the fuel cell 10 in response to a command from the control unit 20. The warning unit 25 may be, for example, formed of a display or light-emitting unit that is recognizable by the user or may be formed of a speaker or a buzzer.

Figure 12:
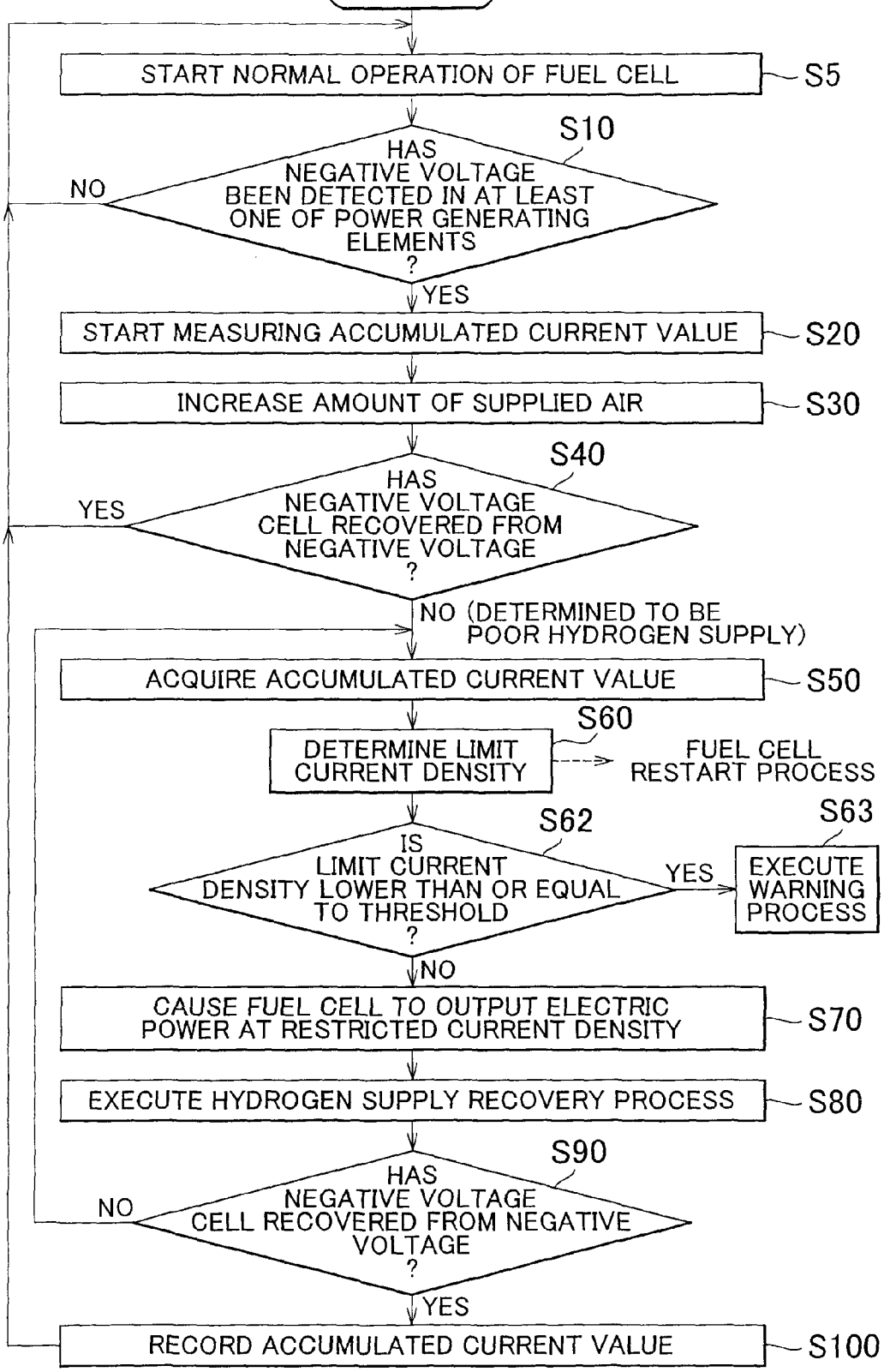
FIG. 12 is a flowchart that shows the procedure of a negative voltage recovery process according to the second alternative embodiment to the first embodiment.

FIG. 12 is a flowchart that shows the procedure of a negative voltage recovery process executed by the fuel cell system 100b. FIG. 12 is substantially the same as FIG. 10 except that steps S62 and S63 are added. In the negative voltage recovery process executed by the fuel cell system 100b according to this configuration example, the allowable range map $M_{PA}$ (FIG. 8A to FIG. 8C) is used to obtain a limit current density in step S60, and then it is determined in step S62 whether the limit current density is lower than or equal to a predetermined threshold. Here, the predetermined threshold may be, for example, a current density required to obtain electric power by which operation of the fuel cell system 100b may be continued.

When it is determined in step S62 that the limit current density is lower than the predetermined threshold, the control unit 20 determines that it is difficult to continue operation of the fuel cell system 100b unless maintenance of the fuel cell 10 is conducted, and then causes the warning unit 25 to execute warning process (step S63).

Specifically, in the warning process, it is applicable that operation of the fuel cell system 100b is stopped and then the user is informed of a message that prompts replacement of the negative voltage cell 11.

In this way, with the fuel cell system 100b according to this configuration example, information that electric power output from the fuel cell 10 is restricted and it is difficult to continue operation of the fuel cell system 100b in the current restricting process is provided to the user of the system by the warning unit 25. Thus, the user is able to know a situation that maintenance of the fuel cell 10 should be conducted. Note that it is applicable that, when the accumulated current value is larger than or equal to a predetermined threshold while the current restricting process is executed or when the accumulated current value is recorded in step S100, the control unit 20 informs the user of that fact through the warning unit 25.

Figure 13:
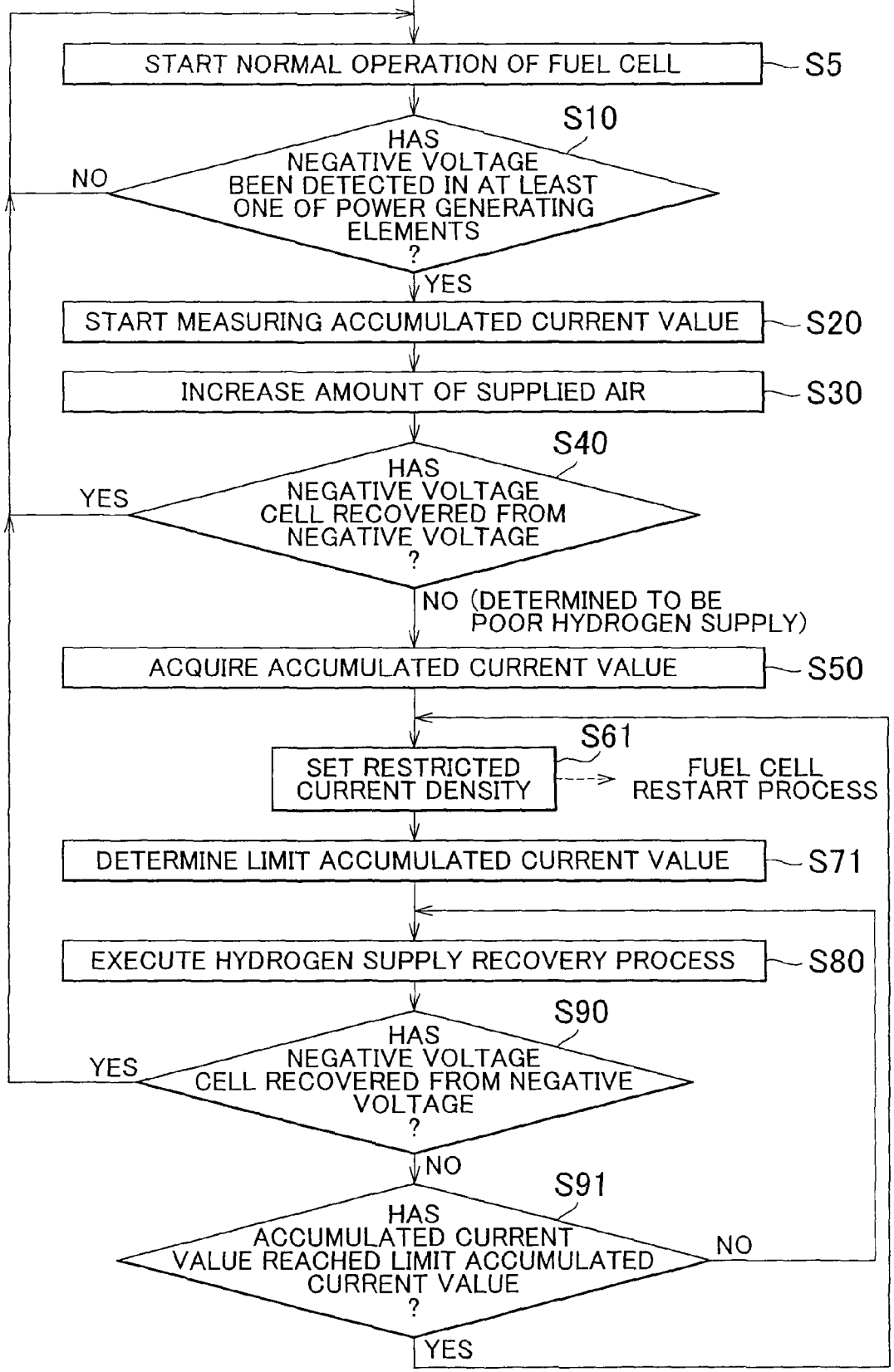
FIG. 13 is a flowchart that shows the procedure of a negative voltage recovery process according to a second embodiment.

Next, a second embodiment will be described. FIG. 13 is a flowchart that shows the procedure of a negative voltage recovery process according to the second embodiment of the invention. FIG. 13 is substantially the same as FIG. 5 except that steps S61 and S71 are provided instead of steps S60 and S70 and step S91 is added. Note that the configuration of a fuel cell system according to the second embodiment is similar to that of the fuel cell system 100 described in the first embodiment (FIG. 1 and FIG. 2). In the fuel cell system according to the second embodiment, in steps S50 to S91, an accumulated current value allowable for the fuel cell 10 is obtained, and then current restricting process is executed on the basis of the accumulated current value.

Figure 14:
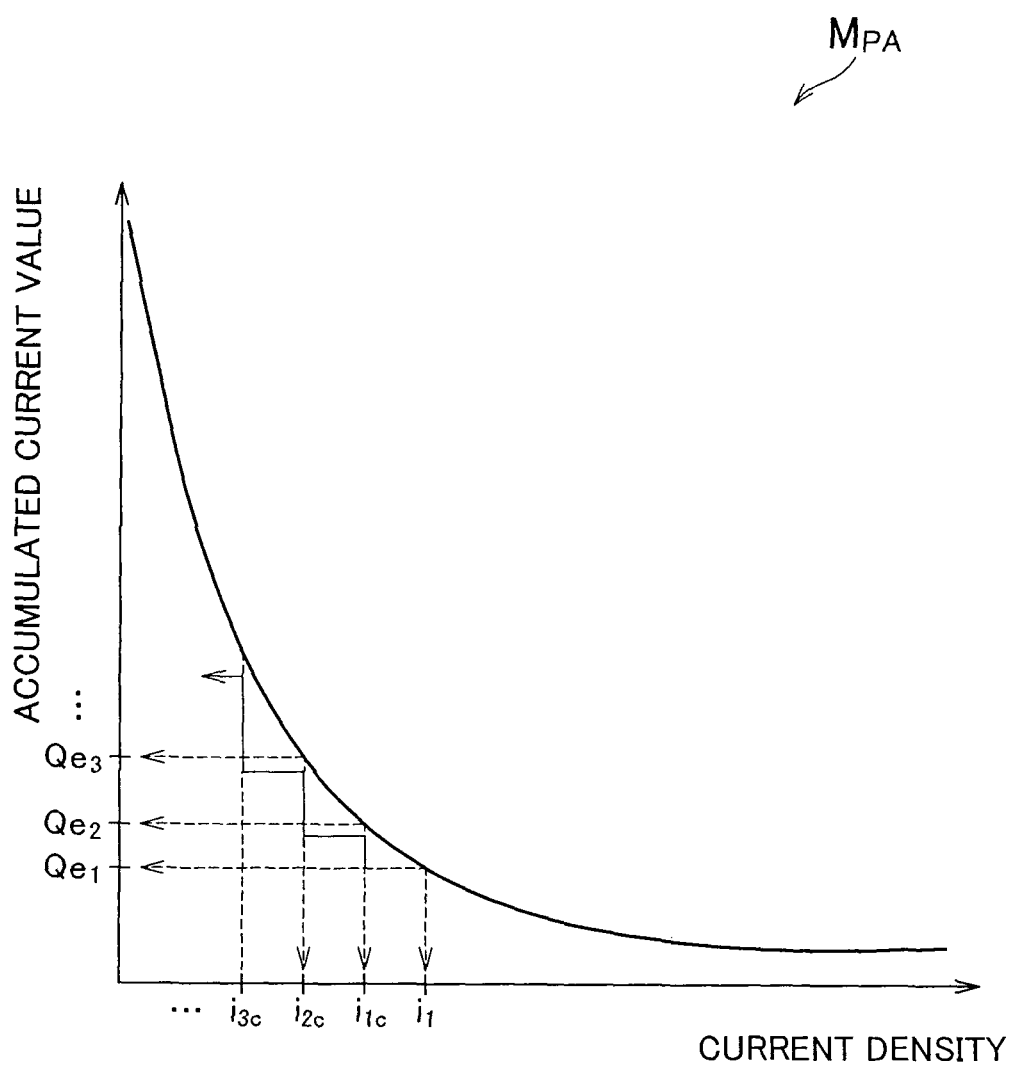
FIG. 14 is a graph for illustrating a current restricting process according to the second embodiment.

FIG. 14 is a graph for illustrating the current restricting process according to the second embodiment, and is a graph that shows an allowable range map $M_{PA}$ similar to that described in the first embodiment. In step S61, the control unit 20 acquires a limit current density $i_1$ corresponding to the accumulated current value $Qe_1$ acquired in step S50. Then, a restricted current density that is smaller by a preset value than the limit current density $i_1$ is determined as an output command value to the fuel cell 10, and then the fuel cell 10 is caused to generate electric power at the restricted current density $i_{1c}$.

In step S71, the control unit 20 uses the allowable range map $M_{PA}$ again to acquire an accumulated current value $Qe_2$ corresponding to the restricted current density $i_{1c}$ that is a command value to the fuel cell 10. The control unit 20 sets a value smaller by a predetermined value than the accumulated current value $Qe_2$ as an accumulated current value (hereinafter, also referred to as "limit accumulated current value") allowable for the fuel cell 10. Then, the control unit 20 executes process for recovering from poor hydrogen supply in step S80, and then determines in step S90 whether the negative voltage cell 11 has recovered from negative voltage.

When the negative voltage cell 11 has recovered from negative voltage, the control unit 20 resumes normal operation control (step S5). In addition, when the negative voltage cell 11 does not recover from negative voltage, the control unit 20 acquires an accumulated current value in a period during which negative voltage is generated from the accumulated current value measuring unit 21, and then determines whether the accumulated current value has reached the limit accumulated current value acquired in step S71 (step S91). When the current accumulated current value has not reached the limit accumulated current value, the control unit 20 repeats the processes of steps S80 and S90.

When the current accumulated current value has reached the limit accumulated current value in step S91, the control unit 20 returns to step S61, and then sets a current density $i_{2c}$ that is smaller by a preset value than the restricted current density $i_{1c}$, which has been set as a command value, as a new command value to the fuel cell 10. In step S71, the allowable range map $M_{PA}$ is used to acquire an accumulated current value $Qe_2$ corresponding to the current density $i_{2c}$, and then a limit accumulated current value is determined on the basis of the accumulated current value $Qe_2$.

In this way, in the current restricting process according to the second embodiment, the control unit 20 uses the allowable range map $M_{PA}$ to obtain a limit accumulated current value corresponding to a current density set as a command value to the fuel cell 10. Then, until the accumulated current value is close to the limit accumulated current value, the fuel cell 10 is caused to continue power generation at the current density set as a command value. When the accumulated current value is close to the limit accumulated current value, the control unit 20 decreases the current density that is a command value, and acquires a limit accumulated current value corresponding to the decreased command value again to thereby cause the fuel cell 10 to continue power generation. By so doing, as indicated by the arrow in the graph of FIG. 14, the current density of the fuel cell 10 reduces along the curve shown in the graph in a stepwise manner with an increase in accumulated current value.

With the fuel cell system according to the second embodiment as well, as in the case of the fuel cell system 100 according to the first embodiment, it is possible to suppress deterioration of the power generation performance of the fuel cell 10 and degradation of the electrodes of the fuel cell 10 due to negative voltage. Note that it is also applicable that the control unit 20 calculates an available power generation duration at a current density that is a command value on the basis of a limit accumulated current value acquired from the allowable range map $M_{PA}$ and then controls the timing at which the current density, that is, the command value, is decreased on the basis of the power generation duration.

Figure 15:
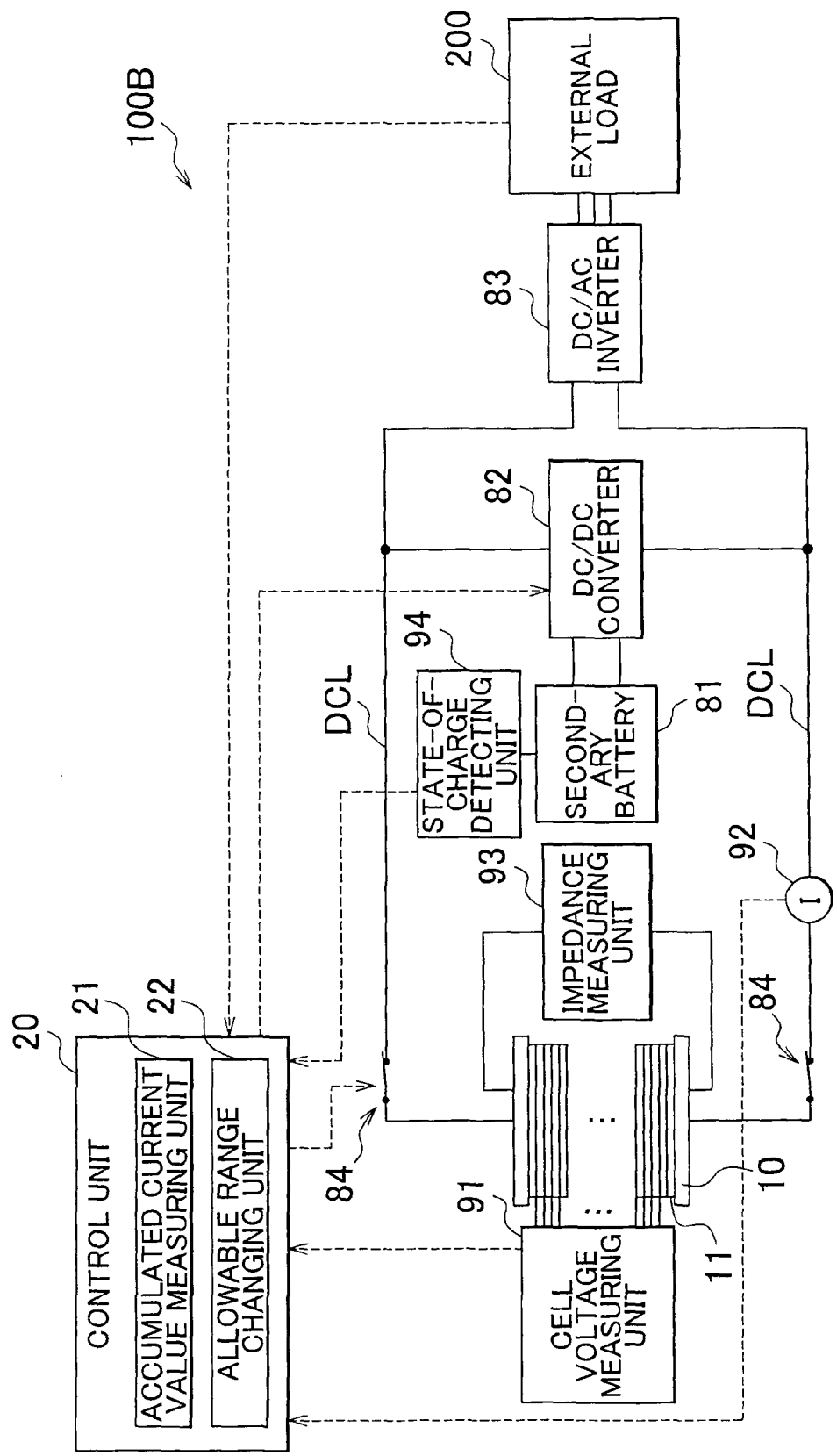
FIG. 15 is a schematic view that shows the electrical configuration of a fuel cell system according to a third embodiment.

Next, a third embodiment will be described. FIG. 15 is a schematic view that shows the electrical configuration of a fuel cell system 100B according to the third embodiment of the invention. FIG. 15 is substantially the same as FIG. 2 except that an on-off switch 84 is added in the direct current power supply line DCL and an allowable range changing unit 22 is added in the control unit 20. Note that the other configuration of the fuel cell system 100B is similar to the configuration described in the first embodiment (FIG. 1). However, in the fuel cell system 100B according to the third embodiment, the fuel cell 10 is operated at a constant operating temperature.

The on-off switch 84 is provided between the DC/DC converter 82 and the fuel cell 10. The on-off switch 84 opens or closes in response to a command from the control unit 20. When the on-off switch 84 is closed, the fuel cell 10 is electrically connected to the external load 200; whereas, when the on-off switch 84 is open, the fuel cell 10 is electrically isolated from the external load 200. Note that, when the fuel cell 10 is isolated from the external load 200, the secondary battery 81 is able to output electric power supplied to the external load 200.

In the fuel cell system 100B according to the third embodiment, the control unit 20 also functions as the allowable range changing unit 22. The allowable range changing unit 22 executes process for changing the operation allowable range of the fuel cell 10 in a current restricting process of a negative voltage recovery process. Specific details of the process will be described later.

Figure 16:
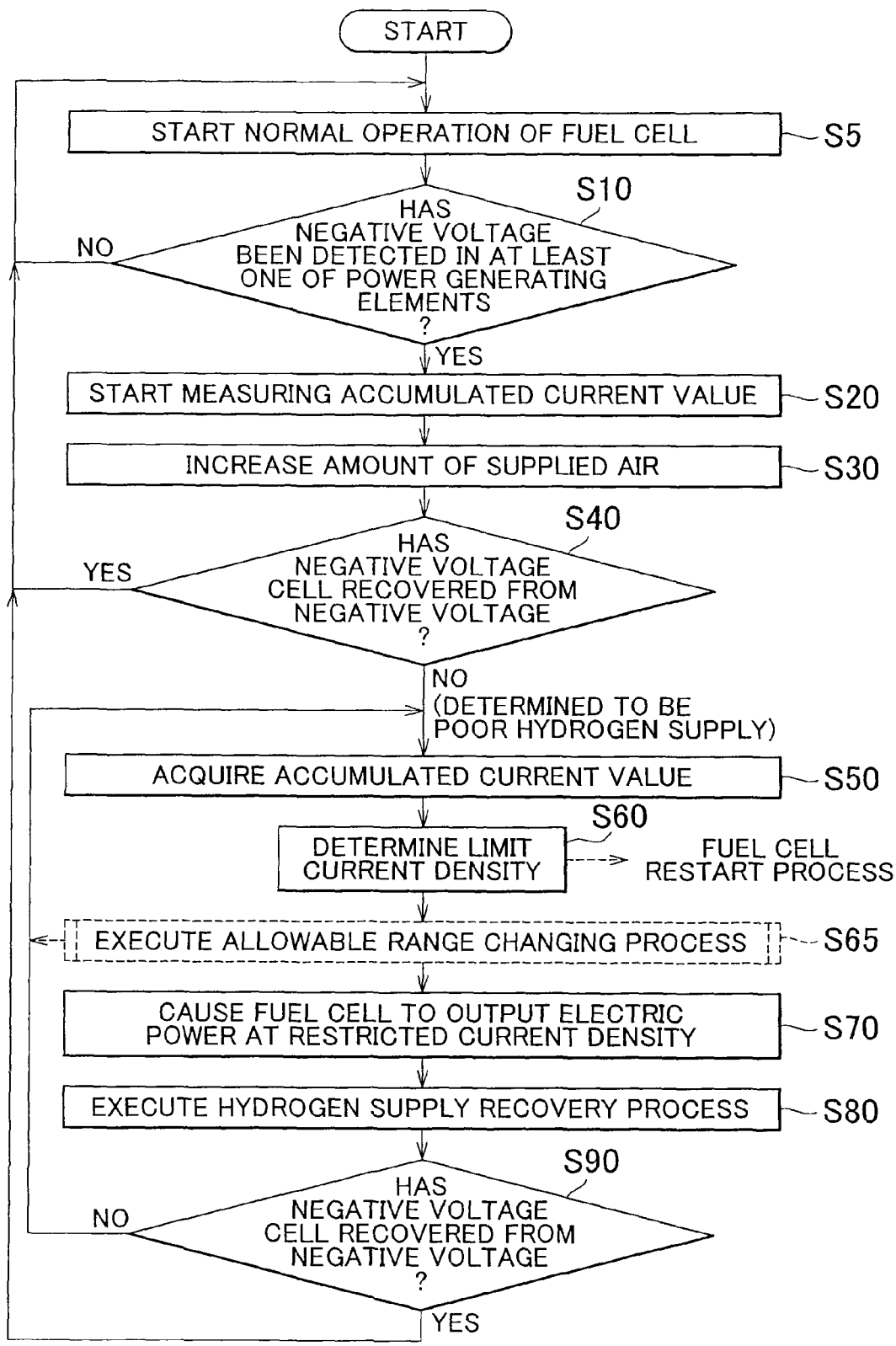
FIG. 16 is a flowchart that shows the procedure of a negative voltage recovery process according to a third embodiment.

FIG. 16 is a flowchart that shows the procedure of the negative voltage recovery process according to the third embodiment. FIG. 16 is substantially the same as FIG. 5 except that step S65 is added. In the fuel cell system 100B according to the third embodiment, as in the case of the fuel cell system 100 according to the first embodiment, the negative voltage recovery process is executed. Then, in the negative voltage recovery process, when it is determined that negative voltage is generated because of poor hydrogen supply, the current restricting process and the poor hydrogen supply recovery process are executed.

Here, in the current restricting process, when the current allowable for the fuel cell 10 is considerably smaller than a target current of the fuel cell 10 for supplying electric power required from the external load 200, there is a possibility that the insufficient current may not be compensated even by the secondary battery 81. Then, in the fuel cell system 100B according to the third embodiment, when the difference between the limit current density acquired in step S60 and the current density for outputting the target current of the fuel cell 10 is larger than a predetermined value, the allowable range changing unit 22 is caused to execute allowable range changing process (step S65).

Figure 17:
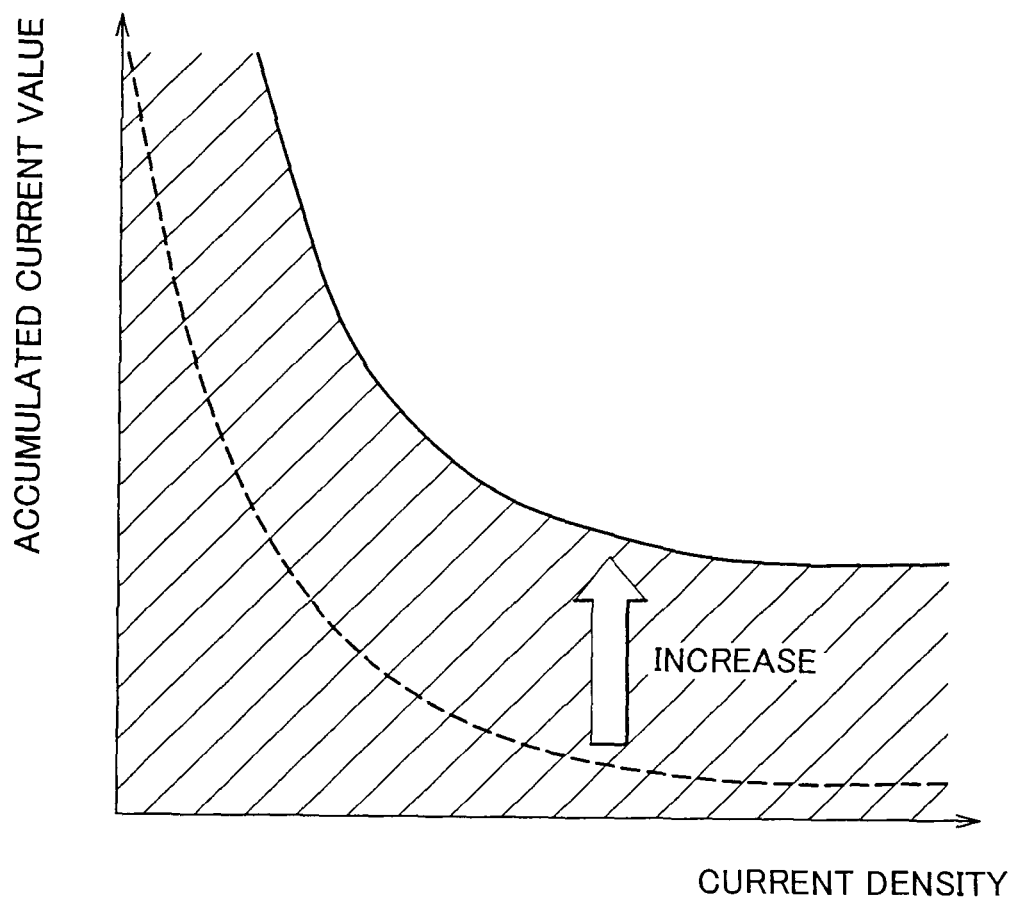
FIG. 17 is a graph that shows a change of an operation allowable range resulting from a change in humidity state inside the fuel cell according to the third embodiment.

FIG. 17 is a graph that illustrates a change of the operation allowable range due to a change in humidity inside the fuel cell 10. The graph shown in FIG. 17 was obtained by conducting an experiment similar to the experiment conducted in order to obtain the graph of FIG. 7 in a state where the humidity inside the fuel cell 10 was decreased. Note that, in FIG. 17, as in the case of the graph of FIG. 7, the operation allowable range below the curve shown in the graph is hatched. In addition, in the graph of FIG. 17, for the sake of convenience, the broken line that indicates the curve shown in the graph of FIG. 7 and the arrow that indicates a change from the broken line curve are shown.

The inventors of the invention found that, by decreasing the humidity inside the fuel cell 10, the curve that shows the correlation between an accumulated current value and a current density in a power generation allowable period shifts upward, and the operation allowable range expands. The reason why the operation allowable range is expanded is because of the following reason.

It is known that, in the power generation allowable period, the reaction expressed by the above described reaction formula (1) and the reaction expressed by the following reaction formula (3) progress in the anode of the negative voltage cell 11 to thereby deactivate the catalyst.

$$Pt+2H_2O \rightarrow PtO_2+4H^++4e^- \qquad (3)$$

As the humidity inside the fuel cell 10 decreases, the amount of water content in the anode (the water content of the membrane electrode assembly) reduces, so the above reactions progress gently and deactivation of the catalyst is suppressed. Therefore, the operation allowable range expands by the amount that the progress of deactivation of the catalyst may be delayed.

That is, by decreasing the humidity inside the fuel cell 10, the operation allowable range of the fuel cell 10 in the current restricting process may be expanded, so it is possible to increase a current density allowable for the fuel cell 10. Then, in the fuel cell system 100B according to the third embodiment, in the allowable range changing process described below, the humidity inside the fuel cell 10 is decreased to expand the operation allowable range.

Figure 18:
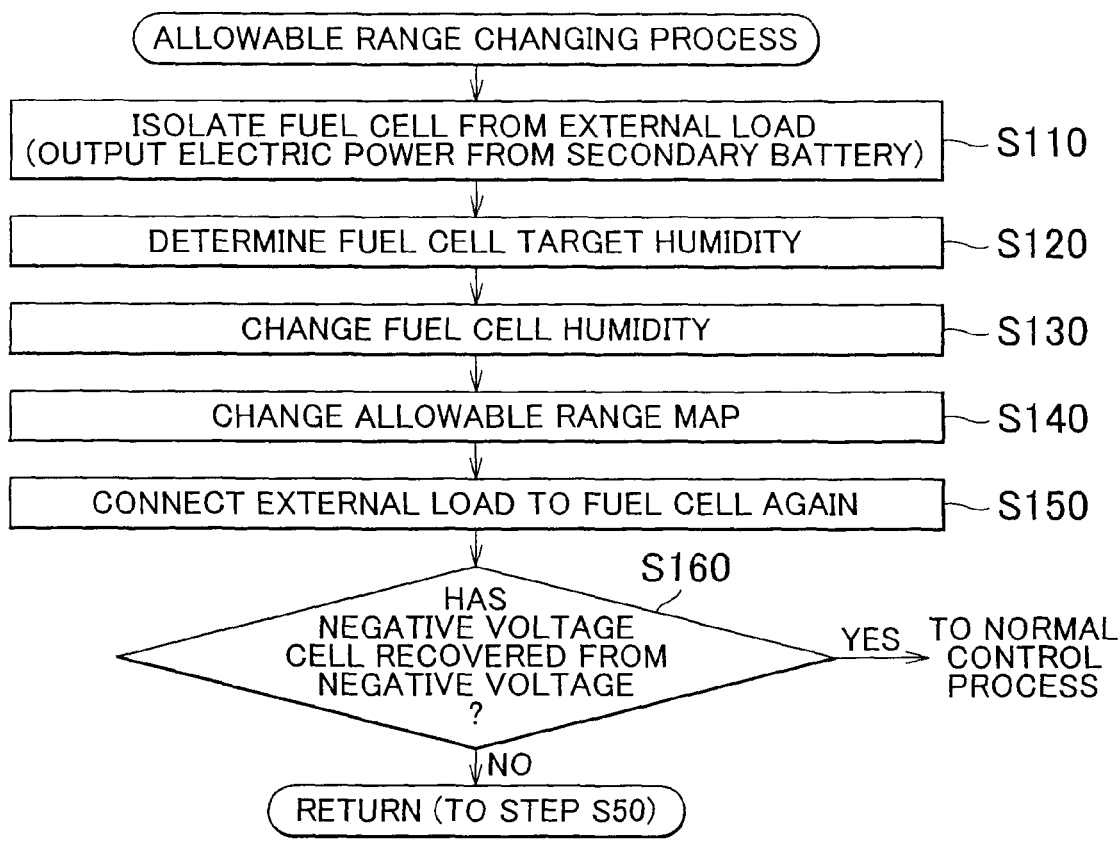
FIG. 18 is a flowchart that shows the procedure of an allowable range changing process according to the third embodiment.

FIG. 18 is a flowchart that shows the procedure of the allowable range changing process executed by the allowable range changing unit 22. In step S110, the allowable range changing unit 22 opens the on-off switch 84 to electrically isolate the fuel cell 10 from the external load 200. Then, electric power is supplied from the secondary battery 81 to the external load 200. The allowable range changing unit 22 causes the fuel cell 10 to stop power generation once to thereby allow the humidity inside the fuel cell 10 to be easily regulated. In step S120, a target humidity inside the fuel cell 10 for expanding the operation allowable range is acquired.

Figure 19:
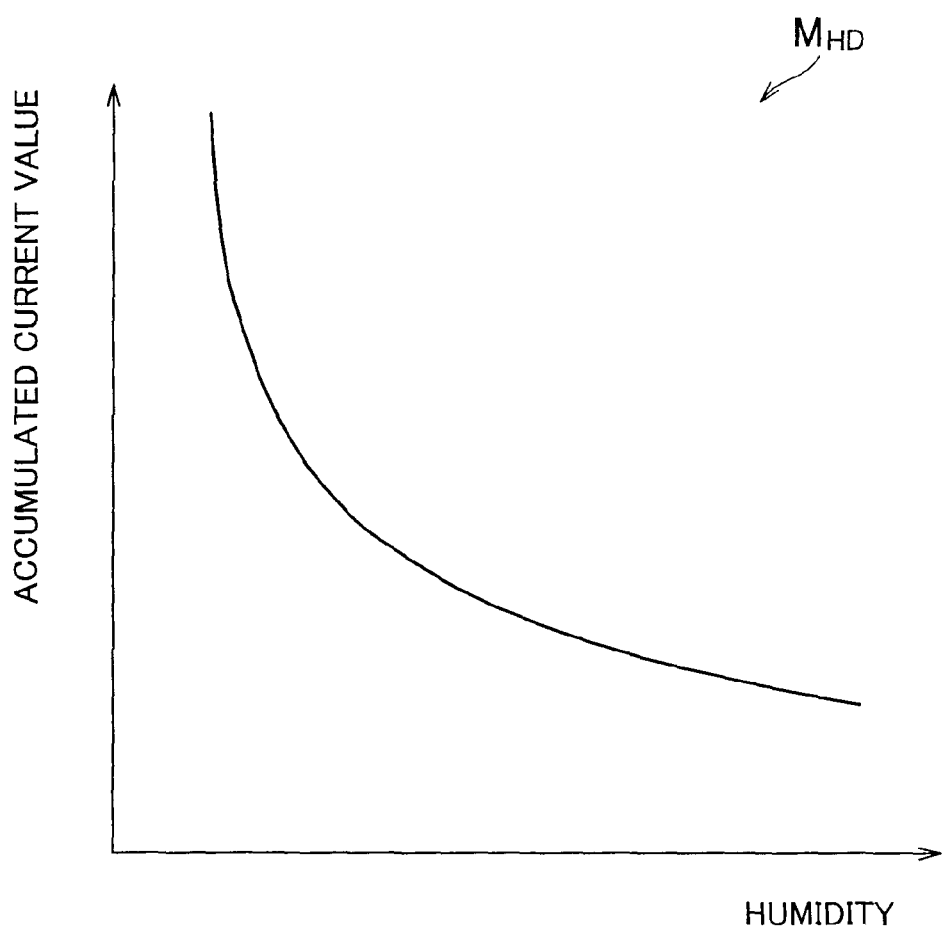
FIG. 19 is a graph that shows an example of a humidity determination map used to determine a target humidity inside the fuel cell according to the third embodiment.

FIG. 19 is a graph that shows an example of a humidity determination map $M_{HD}$ that is used by the allowable range changing unit 22 in order to determine the target humidity inside the fuel cell 10 in step S120. The humidity determination map $M_{HD}$ is shown as a downward-convex decline curve when the ordinate axis represents an accumulated current value and the abscissa axis represents a humidity. The humidity determination map $M_{HD}$ is obtained in such a manner that an experiment similar to that described in FIG. 7 is conducted for each humidity inside the fuel cell 10 to obtain measured values and then the measured values are used to plot a combination of an accumulated current value and a humidity for each current density of the fuel cell 10.

Figure 20A:
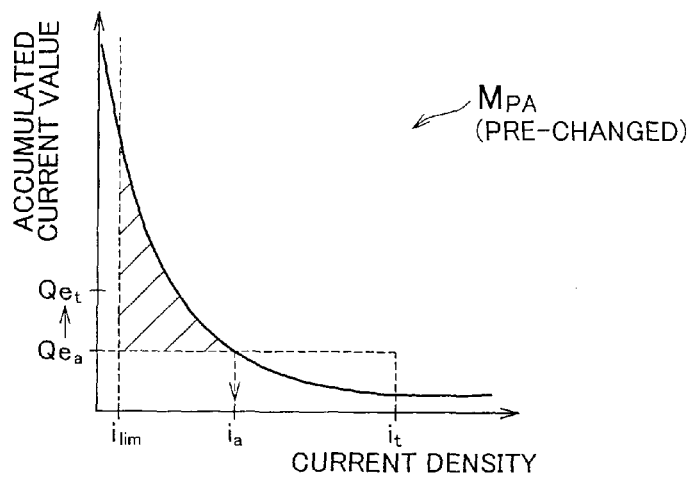
FIG. 20A, FIG. 20B and FIG. 20C are graphs for illustrating a determination process of determining a target humidity inside the fuel cell using a humidity determination map and a changing process of changing an allowable range map according to the third embodiment.
Figure 20B:
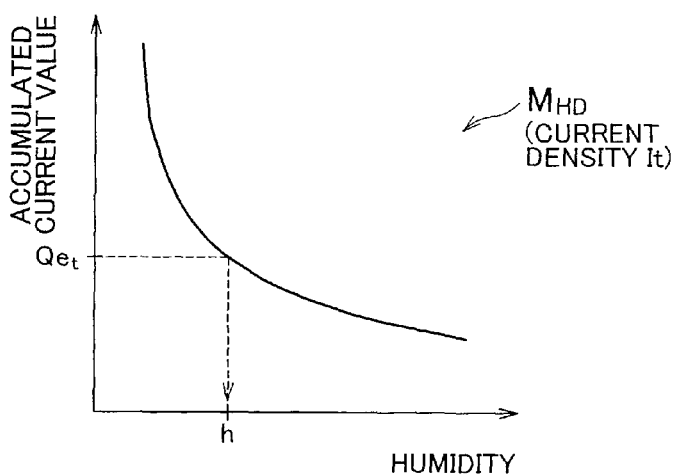

FIG. 20A and FIG. 20B are graphs for illustrating a process of determining a target humidity inside the fuel cell 10 using the humidity determination map $M_{HD}$ in step S120. FIG. 20A is a graph that shows the allowable range map $M_{PA}$ used in step S60 of FIG. 16. Here, it is assumed that, in step S60, an accumulated current value $Qe_a$ has been measured, a limit current density $i_a$ has been determined from the allowable range map $M_{PA}$, and the external load 200 requires a current density $i_r$ outside the operation allowable range of the fuel cell 10. At this time, the allowable range changing unit 22 determines a target humidity inside the fuel cell 10 as follows.

The allowable range changing unit 22 determines an accumulated current value $Qe_t$ that is higher by a predetermined value set in advance than the currently measured accumulated current value $Qe_a$ as the boundary value of the expanded operation allowable range. Then, the humidity determination map $M_{HD}$ corresponding to the required current density is selected from among the humidity determination maps $M_{HD}$ prepared for respective current densities, and then the selected humidity determination map $M_{HD}$ is used to acquire a humidity h corresponding to the accumulated current value $Qe_t$ as a target humidity (FIG. 20B).

In step S130 (FIG. 18), the allowable range changing unit 22 executes control so that the humidity inside the fuel cell 10 coincides with the target humidity acquired in step S120. Specifically, the allowable range changing unit 22 increases the rotational speed of the air compressor 32 of the cathode gas supply unit 30 (FIG. 1) to increase the amount of air supplied to the fuel cell 10 and to decrease the humidification amount of supplied air by the humidifying unit 35. By so doing, the inside of the fuel cell 10 may be scavenged by supplied air of which the humidity is decreased, and the humidity inside the fuel cell 10 may be decreased. Note that the allowable range changing unit 22 determines whether the humidity inside the fuel cell 10 has reached the target humidity on the basis of the value measured by the impedance measuring unit 93.

Figure 20C:
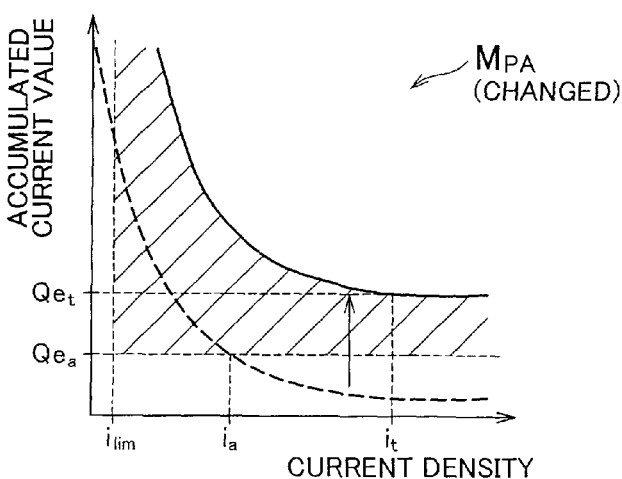

FIG. 20C is a graph for illustrating a process of changing the allowable range map $M_{PA}$ in step S140. FIG. 20C is a graph that shows the changed allowable range map $M_{PA}$. Note that, in FIG. 20C, the curve that indicates the pre-changed allowable range map $M_{PA}$ is shown by the broken line, and the operation allowable range is indicated by hatching.

Here, in the fuel cell system 100B according to the third embodiment, the allowable range map $M_{PA}$ for each humidity inside the fuel cell 10 is prepared in advance and is stored in the control unit 20. The allowable range changing unit 22 selects the allowable range map $M_{PA}$ corresponding to the target humidity acquired in step S120 from among the allowable range maps $M_{PA}$ for respective humidities as a new allowable range map $M_{PA}$. In the current restricting process after the humidity inside the fuel cell 10 has been decreased, the selected new allowable range map $M_{PA}$ is used. Note that the selected new allowable range map $M_{PA}$ has the expanded operation allowable range, so the current density $i_r$ required from the external load 200 is included in the operation allowable range.

In step S150 (FIG. 18), the allowable range changing unit 22 starts up the fuel cell 10, and closes the on-off switch 84 (that is, turns on the on-off switch 84) to electrically connect the fuel cell 10 to the external load 200. In step S160, while the fuel cell 10 is stopped, it is determined whether the negative voltage cell 11 has been recovered from negative voltage. When the negative voltage cell 11 has recovered from negative voltage, normal operation control (step S5 of FIG. 16) of the fuel cell 10 is resumed. On the other hand, when the negative voltage cell 11 has not recovered from negative voltage, the process returns to step S50 and then starts the current restricting process using the selected and changed new allowable range map $M_{PA}$.

In this way, the fuel cell system 100B according to the third embodiment is able to expand the operation allowable range of the fuel cell 10 in the current restricting process by regulating the humidity inside the fuel cell 10. Thus, with the fuel cell system 100B according to the third embodiment, it is possible to further reliably supply electric power corresponding to a request from the external load 200 while suppressing performance deterioration and degradation of the fuel cell due to negative voltage.

Figure 21A:
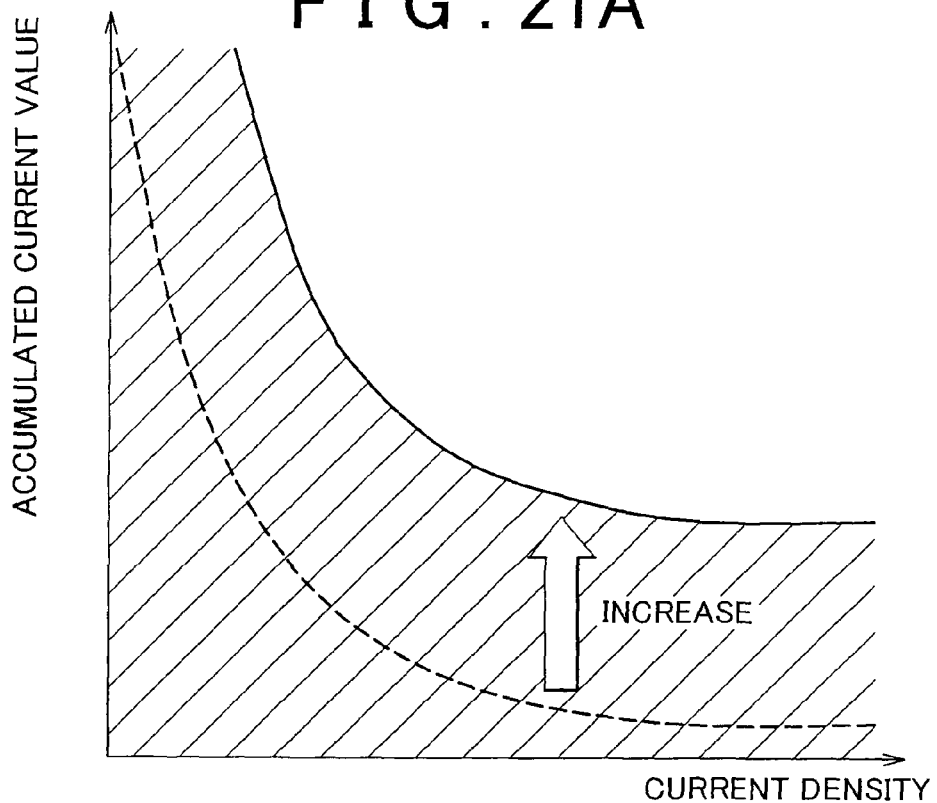
FIG. 21A and FIG. 21B are graphs for illustrating an allowable range changing process in a fuel cell system according to a fourth embodiment.
Figure 21B:
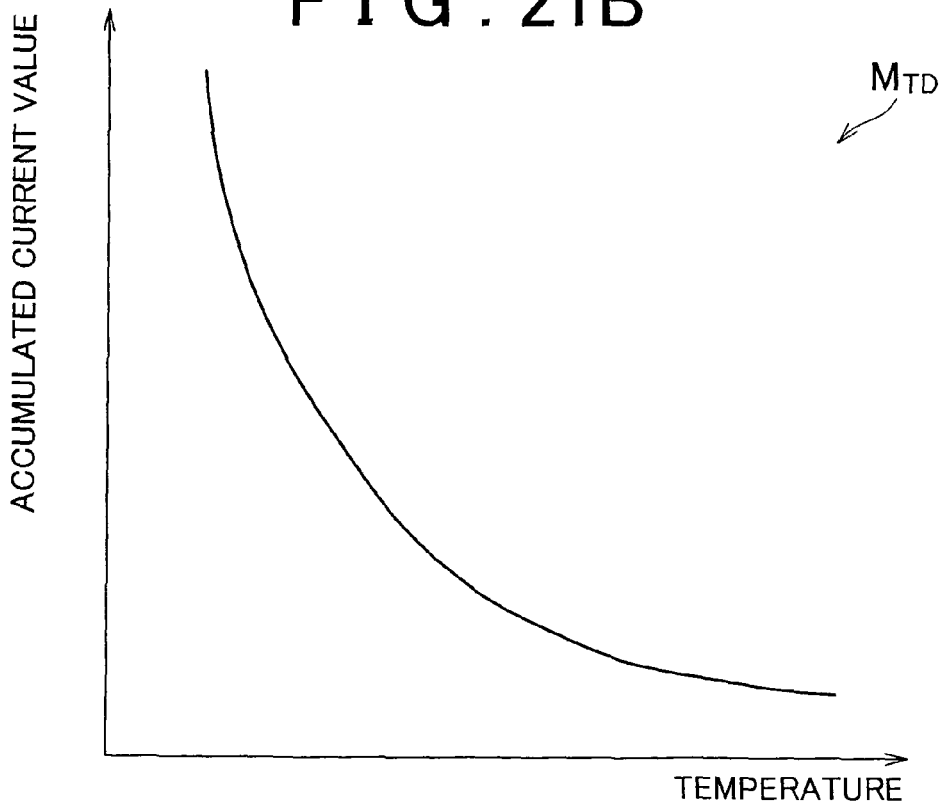

Next, a fourth embodiment will be described. FIG. 21A and FIG. 21B are graphs for illustrating an allowable range changing process in a fuel cell system according to the fourth embodiment of the invention. Note that the configuration of the fuel cell system according to the fourth embodiment is similar to that of the fuel cell system according to the third embodiment. However, in the fuel cell system according to the fourth embodiment, the fuel cell 10 is operated in a state where the humidity inside the fuel cell 10 is kept constant.

FIG. 21A is a graph that shows a variation in the correlation between an accumulated current value and a current density in a power generation allowable period when the temperature of the fuel cell 10 is varied, as in the case of FIG. 17. The solid line in FIG. 21A was obtained in such a manner that an experiment similar to the experiment conducted in order to obtain the graph of FIG. 7 is conducted in a state where the temperature of the fuel cell 10 is decreased.

The curve that shows the correlation between an accumulated current value and a current density shifted upward when the temperature of the fuel cell 10 was decreased. This is because the progress of the reaction expressed by the reaction formula (3) described in the third embodiment becomes gentle because of a decrease in the temperature of the fuel cell 10. In this way, by decreasing the operating temperature of the fuel cell 10, as in the case described in the third embodiment, it is possible to expand the operation allowable range of the fuel cell 10 in the current restricting process.

Here, an experiment similar to that described in FIG. 7 is conducted with a different operating temperature of the fuel cell 10, and the correlation between an accumulated current value and a current density is obtained for each operating temperature of the fuel cell 10 in advance to thereby make it possible to obtain the allowable range map $M_{PA}$ for each operating temperature of the fuel cell 10. In addition, it is possible to obtain an operating temperature determination map $M_{TD}$ for each current density, which shows the correlation between an accumulated current value and an operating temperature of the fuel cell 10 on the basis of the experimental data. FIG. 21B shows an example of the operating temperature determination map $M_{TD}$ at a current density in a graph of which the ordinate axis represents an accumulated current value and the abscissa axis represents an operating temperature of the fuel cell 10.

In the fuel cell system according to the fourth embodiment, the allowable range map $M_{PA}$ for each operating temperature of the fuel cell 10 and the operating temperature determination map $M_{TD}$ for each current density are stored in the control unit 20 in advance. Then, the allowable range changing process described in the third embodiment is executed using these maps $M_{PA}$ and $M_{TD}$ by regulating the operating temperature of the fuel cell 10 instead of regulating the humidity inside the fuel cell 10. Note that the operating temperature of the fuel cell 10 may be regulated in such a manner that the rotational speed of the refrigerant circulation pump 73 of the refrigerant supply unit 70 is controlled to change the cooling efficiency by refrigerant.

In this way, with the fuel cell system according to the fourth embodiment, as in the case of the fuel cell system according to the third embodiment, it is possible to further reliably supply electric power corresponding to a request from the external load 200 while suppressing performance deterioration and degradation of the fuel cell 10 due to negative voltage.

Figure 22:
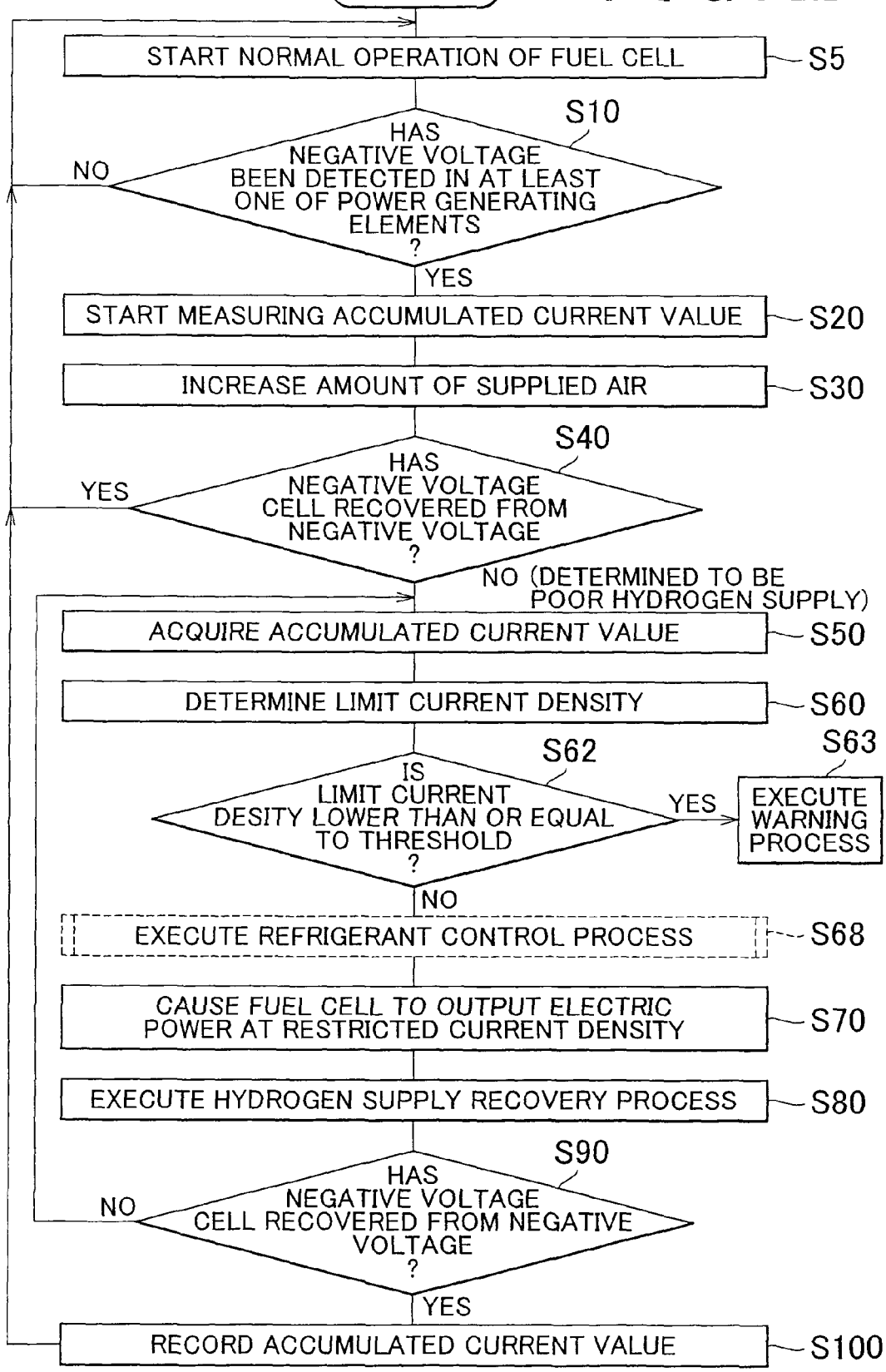
FIG. 22 is a flowchart that shows the procedure of a negative voltage recovery process according to a fifth embodiment.

Next, a fifth embodiment will be described. FIG. 22 is a flowchart that shows the procedure of a negative voltage recovery process executed in a fuel cell system according to the fifth embodiment of the invention. FIG. 22 is substantially the same as FIG. 12 except that a refrigerant control process of step S68 is added. Note that the configuration of the fuel cell system according to the fifth embodiment is similar to that of the fuel cell system 100b according to the second alternative embodiment to the first embodiment (FIG. 1, FIG. 11). Note that, in the fuel cell system according to the fifth embodiment, when the outside air temperature or the temperature of the fuel cell 10 is below zero or when the system starts up, refrigerant is supplied from the refrigerant supply unit 70 to the fuel cell 10 at a minimum constant flow rate at which degradation of the fuel cell 10 is suppressed.

Here, in order to recover from a state where negative voltage is generated because of freeze in the reaction gas flow passages of the fuel cell 10, the operating temperature of the fuel cell 10 is desirably caused to reach above zero to eliminate the frozen state. However, when the current restricting process is executed, heat generation of the fuel cell 10 is suppressed by the amount that the output current of the fuel cell 10 is restricted (Joule's law). Therefore, in this case, it is difficult to increase the operating temperature of the fuel cell 10. Then, in the fuel cell system according to the fifth embodiment, when the current restricting process is executed in a low temperature environment, such as below zero, the refrigerant control process of step S68 is executed to facilitate an increase in the operating temperature of the fuel cell 10.

Figure 23:
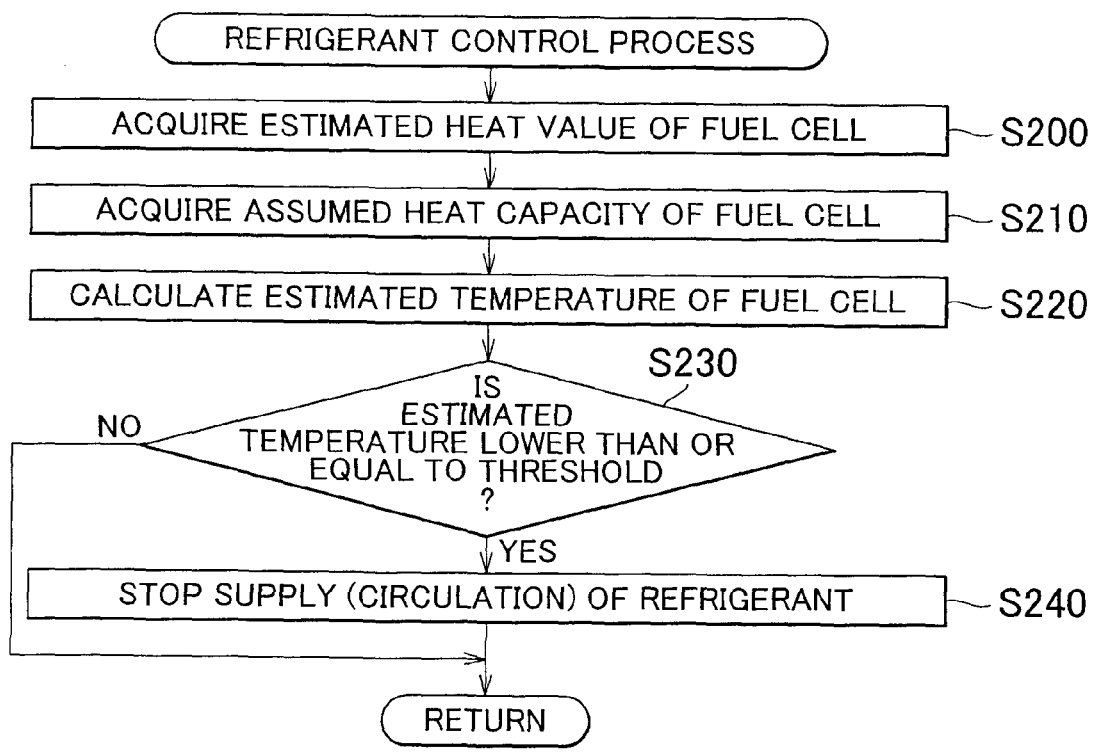
FIG. 23 is a flowchart that shows the procedure of a refrigerant control process according to the fifth embodiment.

FIG. 23 is a flowchart that shows the procedure of the refrigerant control process of step S68. The refrigerant control process may be executed each time the current restricting process is executed at the time of a start-up of the fuel cell system. In addition, the refrigerant control process may be executed when the operating temperature of the fuel cell 10, obtained on the basis of values measured by the refrigerant temperature measuring units 74 and 75, is below zero or when the outside air temperature is below zero.

In step S200, the control unit 20 acquires an estimated heat value (hereinafter, referred to as "estimated heat value Qe") when the fuel cell 10 is caused to generate electric power for a predetermined power generation duration t (for example, about 10 to 30 seconds) at a restricted current density obtained from a limit current density. Specifically, the control unit 20 may calculate the estimated heat value Qe using the mathematical expression (4) based on Joule's law.

$$Qe=I^2 \times R \times t \qquad (4)$$

Here, I is a restricted current density, and R is a constant that is preset on the basis of the internal resistance of the fuel cell 10. Note that the control unit 20 may acquire an estimated heat value corresponding to a restricted current density on the basis of a map or table obtained through an experiment, or the like, in advance instead of the above mathematical expression (4).

In step S210, the control unit 20 acquires an assumed heat capacity Cc of the fuel cell 10 when refrigerant is circulated in the fuel cell 10 by the refrigerant supply unit 70. Here, the "assumed heat capacity Cc of the fuel cell 10" is a value corresponding to a heat quantity by which the temperature of the fuel cell 10 is increased by 1° C.

Incidentally, when refrigerant is circulated in the fuel cell 10, the heat quantity required to increase the temperature of the fuel cell 10 varies depending on the temperature of the fuel cell 10 or the temperature and flow rate of refrigerant. As described above, in the fuel cell system according to the fifth embodiment, refrigerant is supplied to the fuel cell 10 at a preset minimum constant flow rate. Then, in the fuel cell system according to the fifth embodiment, the control unit 20 prestores a map or table that is able to uniquely determine an assumed heat capacity Cc corresponding to the temperature of refrigerant and the temperature of the fuel cell 10, and uses the map or table to acquire the assumed heat capacity Cc.

In step S220, the control unit 20 uses the estimated heat value Qe acquired in step S200 and the assumed heat capacity Cc of the fuel cell 10, acquired in step S210, to calculate an estimated temperature Te that is a predicted temperature of the fuel cell 10 after the predetermined power generation duration t. Specifically, the estimated temperature Te may be calculated using the following mathematical expression (5).

$$Qe=Cc \times (Te-Tm) \qquad (5)$$

Here, Tm is a current measured operating temperature of the fuel cell 10.

In step S230, the control unit 20 determines whether the estimated temperature Te calculated in step S220 is lower than or equal to a predetermined threshold. Here, the predetermined threshold may be set at a temperature (for example, 0° C.) at which a frozen state in the reaction gas flow passages of the fuel cell 10 begins to be eliminated.

When the estimated temperature Te is higher than the predetermined threshold, the control unit 20 executes processes in step S70 and the following steps of the current restricting process (FIG. 22) while continuing supply of refrigerant to the fuel cell 10 on the assumption that the operating temperature of the fuel cell 10 reaches a target value in a predetermined power generation duration t. On the other hand, when the estimated temperature Te is lower than or equal to the predetermined threshold, the control unit 20 stops supply and circulation of refrigerant to the fuel cell 10 in order to facilitate an increase in temperature of the fuel cell 10 in the predetermined power generation duration t (step S240).

Here, in the fuel cell system according to the fifth embodiment, as described above, refrigerant is supplied to the fuel cell 10 even when the temperature of the fuel cell 10 is low, such as at the time of a system start-up. This is because of the following reason. That is, at the time of a system start-up, or the like, because of blockage of the gas flow passages inside the fuel cell 10, it is highly likely that the amount of generated electric power becomes nonuniform among the power generating elements 11 of the fuel cell 10 or among power generating regions of each power generating element 11.

When supply of refrigerant to the fuel cell 10 is stopped while a power generation distribution inside the fuel cell 10 is nonuniform, the power generating element 11 or region that generates a relatively large amount of electric power may locally degrade because of heat generation resulting from power generation. In order to avoid local degradation of the fuel cell 10 due to the nonuniform amount of heat value, even when the temperature of the fuel cell 10 is low, refrigerant is desirably supplied to the fuel cell 10.

However, when the current restricting process is executed, the heat value of the fuel cell 10 is restricted, so the heat value is relatively small at a portion at which the amount of generated electric power locally increases in the fuel cell 10. Thus, as in the case of step S240, even when supply of refrigerant to the fuel cell 10 is stopped during the current restricting process, it is less likely that degradation of the fuel cell 10 occurs because of the nonuniform heat value as described above. Therefore, by stopping supply of refrigerant, it is possible to facilitate an increase in the temperature of the fuel cell 10 without degradation of the fuel cell 10.

After supply of refrigerant to the fuel cell 10 is stopped in step S240, the control unit 20 executes processes of step S70 and the following steps of the current restricting process (FIG. 22). Note that, when the negative voltage cell 11 has recovered from negative voltage and normal operation of the fuel cell 10 is resumed, the control unit 20 restarts supply of refrigerant to the fuel cell 10.

In this way, with the fuel cell system according to the fifth embodiment, even when negative voltage occurs in the fuel cell 10 and the current restricting process is executed, supply of refrigerant to the fuel cell 10 is appropriately controlled to facilitate an increase in the operating temperature of the fuel cell 10. Thus, recovery from the negative voltage state is facilitated with an increase in the temperature of the fuel cell 10.

Figure 24:
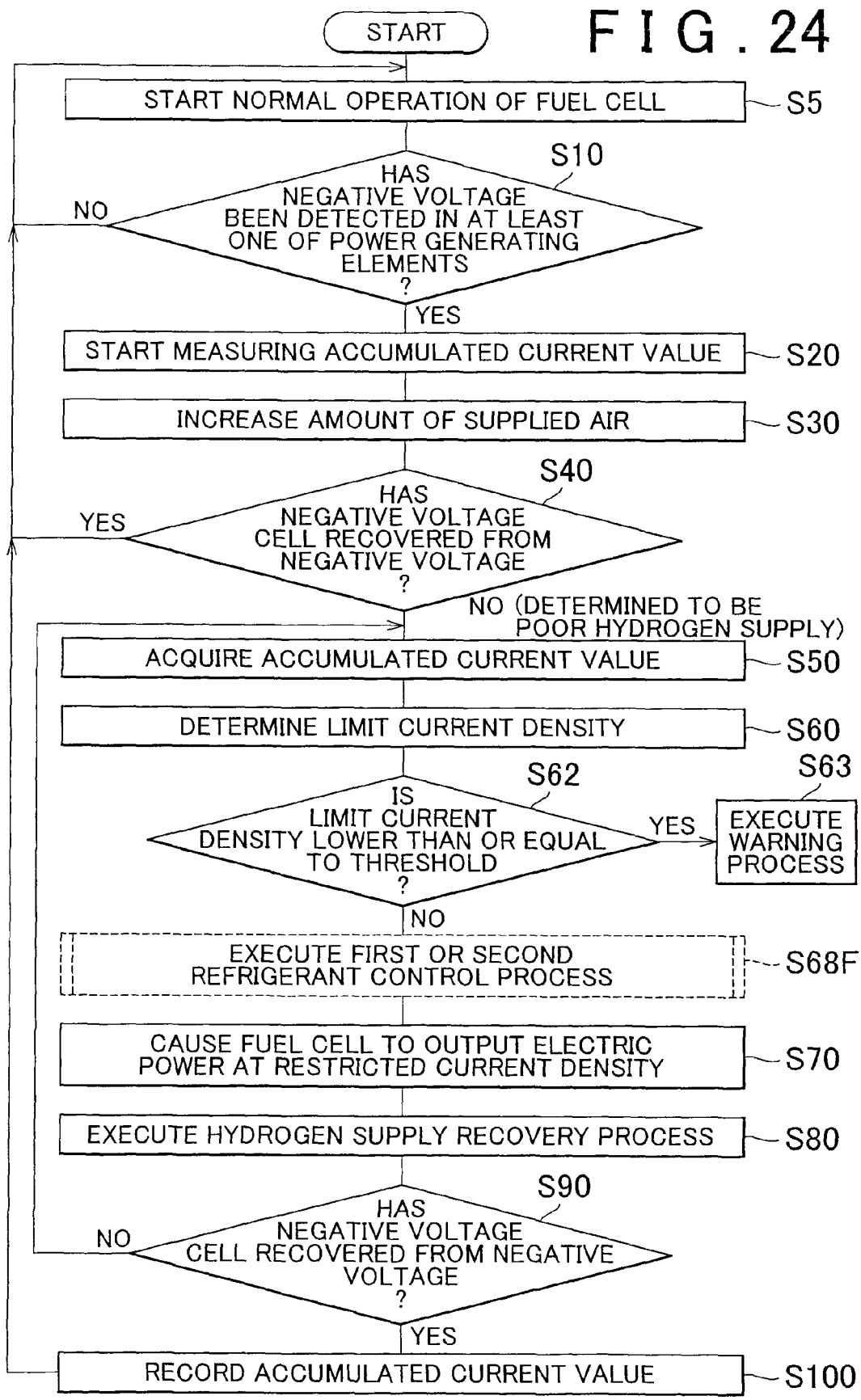
FIG. 24 is a flowchart that shows the procedure of a negative voltage recovery process according to a sixth embodiment.

Next, a sixth embodiment will be described. FIG. 24 is a flowchart that shows the procedure of a negative voltage recovery process executed in a fuel cell system according to the sixth embodiment of the invention. FIG. 24 is substantially the same as FIG. 22 except that step S68F is provided instead of step S68. Note that the configuration of the fuel cell system according to the sixth embodiment is similar to the configuration of the fuel cell system described in the fifth embodiment (FIG. 1, FIG. 11). Note that, in the fuel cell system according to the sixth embodiment, the control unit 20 measures and records the operating temperature of the fuel cell 10 periodically (for example, at an interval of one second).

In the fuel cell system according to the sixth embodiment, when the current restricting process is executed while the system starts up or the temperature of the fuel cell 10 is low (for example, temperature is at or below 0° C.), first or second refrigerant control process is executed after step S62 (step S68F). Specifically, in step S68F after the current restricting process is started, the first refrigerant control process is executed. Then, through the steps of the current restricting process, when a predetermined condition is satisfied at the time when step S68F is executed again, the second refrigerant control process is executed.

Figure 25A:
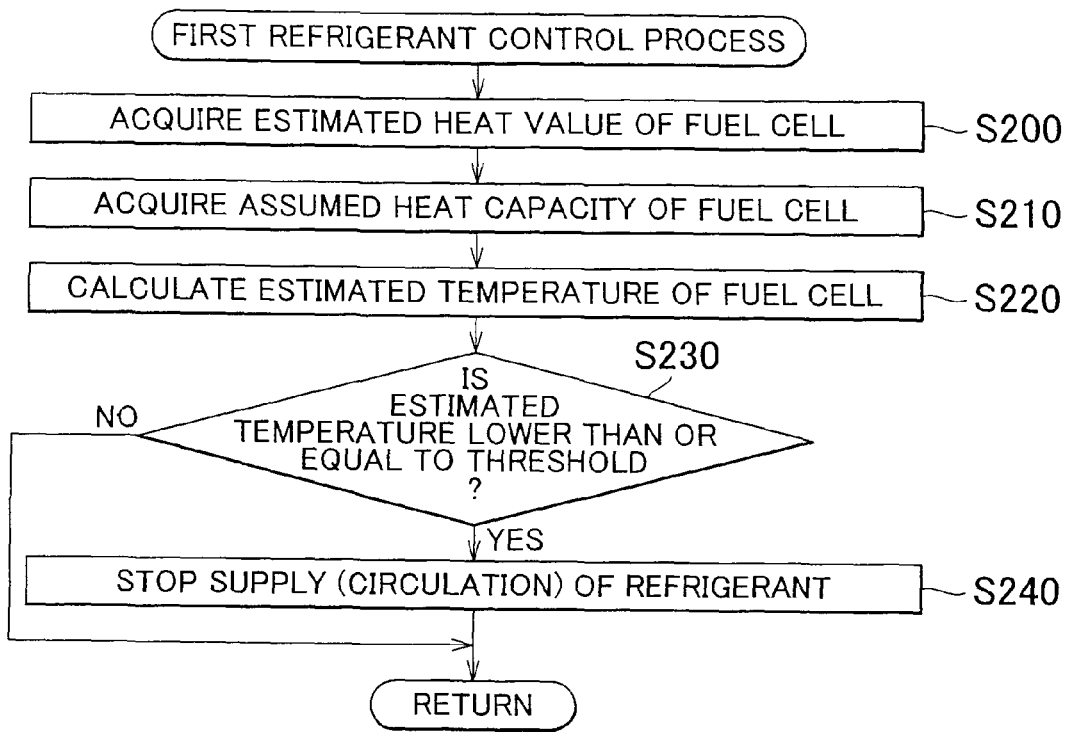
FIG. 25A and FIG. 25B are flowcharts that respectively show first and second refrigerant control processes according to the sixth embodiment.

FIG. 25A is a flowchart that shows the procedure of the first refrigerant control process. FIG. 25A is substantially the same as FIG. 23. That is, the first refrigerant control process is executed in a manner similar to that of the refrigerant control process described in the fifth embodiment. In the first refrigerant control process, when it is determined in step S230 that it is difficult for the operating temperature of the fuel cell 10 to reach the target operating temperature through the current restricting process, supply of refrigerant to the fuel cell 10 is stopped (step S240).

Figure 25B:
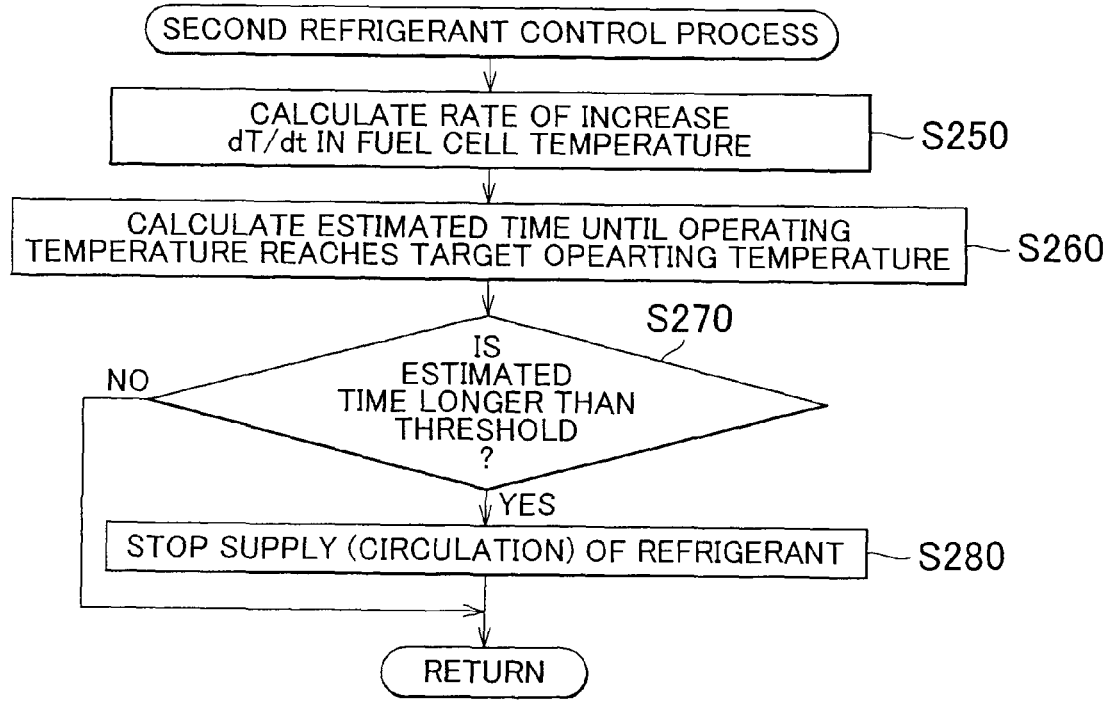

FIG. 25B is a flowchart that shows the procedure of the second refrigerant control process. The second refrigerant control process is executed when supply of refrigerant to the fuel cell 10 is not stopped in the first refrigerant control process. In step S250, the control unit 20 calculates the rate of increase (dT/dt) in operating temperature T, which is the rate of time change in the operating temperature T of the fuel cell 10, on the basis of the recorded operating temperature of the fuel cell 10.

In step S260, the control unit 20 calculates an estimated time te until the operating temperature T of the fuel cell 10 reaches a target operating temperature (for example, 0° C.) on the basis of the calculated rate of increase in the operating temperature T. In step S270, the control unit 20 executes determination process using the estimated time te. When the estimated time te is longer than a predetermined threshold (for example, 30 seconds), the control unit 20 determines that the operating temperature of the fuel cell 10 does not reach the target operating temperature within a predetermined period of time in a state where supply of refrigerant is continued, and then stops supply of refrigerant to the fuel cell 10 (step S280).

On the other hand, when the estimated time te is shorter than or equal to the predetermined threshold, the control unit 20 determines that the operating temperature of the fuel cell 10 can reach the target operating temperature within the predetermined period of time even when supply of refrigerant to the fuel cell 10 is continued. Then, the control unit 20 continuously executes the current restricting process (FIG. 22) while continuing supply of refrigerant to the fuel cell 10.

Here, in the first refrigerant control process, even when it is determined that the operating temperature of the fuel cell 10 reaches the target temperature within a predetermined power generation duration even when supply of refrigerant is continued, the operating temperature may not increase than predicted because electric power output from the fuel cell 10 is restricted. However, with the fuel cell system according to the sixth embodiment, in the second refrigerant control process, it is determined again whether supply of refrigerant to the fuel cell 10 is continued on the basis of the rate of time change in actually measured operating temperatures of the fuel cell 10. Thus, when the current restricting process is executed while the system starts up or the temperature of the fuel cell 10 is low, refrigerant supply control is further appropriately executed, so an increase in the temperature of the fuel cell 10 is facilitated, and recovery from the negative voltage state is facilitated.

Figure 26A:
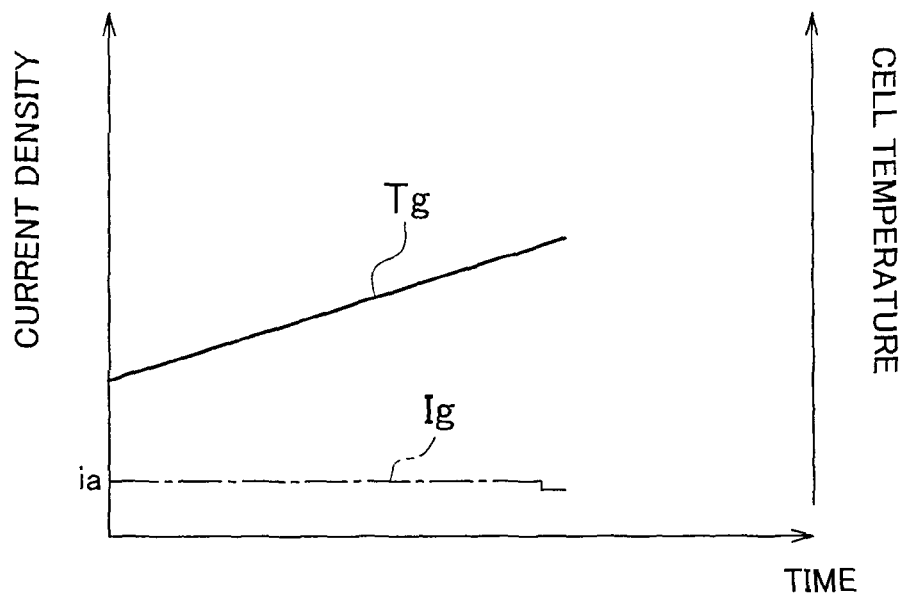
FIG. 26A and FIG. 26B are graphs for illustrating a time change in cell temperature of a negative voltage cell under a low temperature environment according to reference examples of the invention.
Figure 26B:
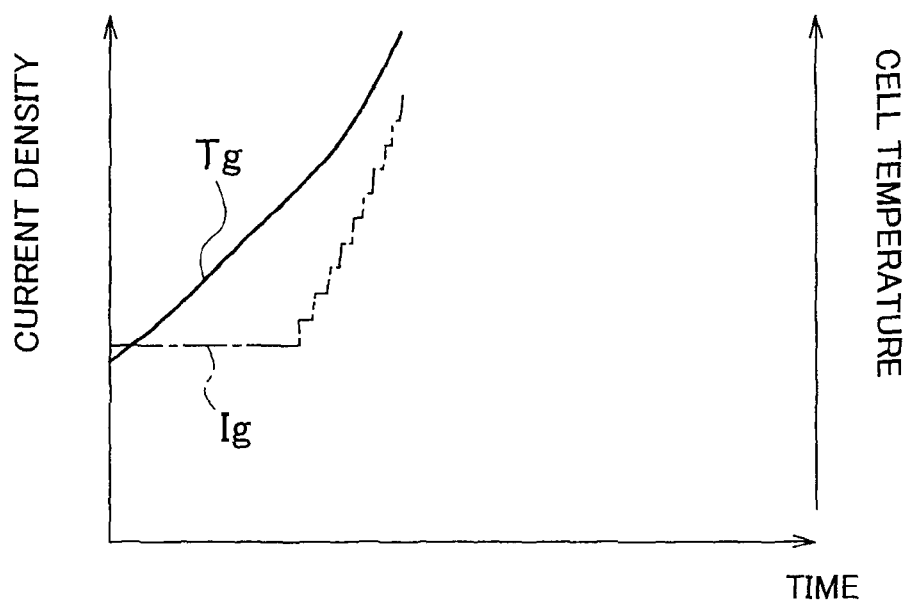

FIG. 26A and FIG. 26B are graphs that show the results of the experiments conducted by the inventors of the invention as reference examples of the invention. FIG. 26A and FIG. 26B are graphs that show a time variation in the temperature of the negative voltage cell (cell temperature) and a time variation in the current density of the fuel cell when one of the single cells of the fuel cell is caused to generate negative voltage in a low temperature environment below zero. FIG. 26A shows the case where electric power output from the fuel cell is restricted at a substantially constant low current density. FIG. 26B shows the case where the current density is gradually increased. Note that the scale of each of the ordinate axis and abscissa axis of FIG. 26A and FIG. 26B is equal to each other.

Here, negative voltage in part of the single cells of the fuel cell may possibly occur because water content that remains in the reaction gas flow passages provided in the part of the single cells freezes in a low temperature environment and then the gas flow passages are blocked. In such a case, it is desirable that the temperature of the fuel cell is increased to defrost the frozen water content in the gas flow passages to thereby eliminate poor reaction gas supply, thus recovering from negative voltage.

As shown in the graphs of FIG. 26A and FIG. 26B, an increase in cell temperature is gentler when the fuel cell is cause to output electric power at a constant low current density than when the fuel cell is caused to output electric power at a current density higher than the constant low current density. Thus, when negative voltage is generated, the fuel cell is desirably caused to output electric power at a high current density as much as possible to thereby increase the operating temperature of the fuel cell in a short period of time.

In the current restricting process when negative voltage is generated, described in the above embodiments, the current density is decreased in a stepwise manner along the downward-convex curve that shows the allowable range map $M_{PA}$ with an increase in accumulated current value. By so doing, the fuel cell 10 may be operated at near an allowable limit current density in the operation allowable range, so it is possible to increase the temperature of the fuel cell 10 in a further short period of time in a low temperature environment, so it is easy to recover from negative voltage. That is, it is more desirable in the case of the current restricting process according to the above embodiments than when current is restricted to a constant low current density when negative voltage is generated.

Note that the aspect of the invention is not limited to the above examples or embodiments; the aspect of the invention may be implemented in various forms without departing from the scope of the invention. For example, the following first to thirteenth alternative embodiments are possible.

At first, the first alternative embodiment will be described. In the above described embodiments, the control unit 20 stores, as the allowable range map $M_{PA}$, the correlation between accumulated current values allowable for the fuel cell 10 and current densities allowable for the fuel cell 10 in a period during which negative voltage is generated. However, the correlation does not need to be stored as a map; instead, for example, the correlation may be stored as an arithmetic expression or a function.

Next, the second alternative embodiment will be described. In the above described embodiments, the correlation between accumulated current values allowable for the fuel cell 10 and current densities allowable for the fuel cell 10 in a period during which negative voltage is generated is set in the allowable range map $M_{PA}$ as defined by the downward-convex decline curve. However, the correlation may be set in the allowable range map $M_{PA}$ as defined by a curve having another shape. For example, the correlation may be set in the allowable range map $M_{PA}$ as defined by a linear line that linearly declines. However, the downward-convex decline curve that defines the allowable range map $M_{PA}$ in the above embodiments is based on the experiment conducted by the inventors of the invention, and is more desirable as a graph that defines the operation allowable range in a period during which negative voltage is generated.

Next, the third alternative embodiment will be described. In the above described embodiments, in the current restricting process of the negative voltage recovery process, the current density of the fuel cell 10 is decreased in a stepwise manner along the downward-convex curve that defines the allowable range map $M_{PA}$ with an increase in accumulated current value. However, in the current restricting process, the current density of the fuel cell 10 may not be decreased in a stepwise manner along the downward convex curve. The current density of the fuel cell 10 just needs to be controlled so as to fall within the operation allowable range that is defined in the allowable range map $M_{PA}$. However, as in the case of the above embodiments, the current density of the fuel cell 10 is more desirably decreased in a stepwise manner along the downward-convex curve because it is possible to execute control at a current density closer to an allowable limit current density in the current restricting process.

Next, the fourth alternative embodiment will be described. In the above described embodiments, the cell voltage measuring unit 91 measures the voltages of all the power generating elements 11 of the fuel cell 10 to thereby detect negative voltage. However, the cell voltage measuring unit 91 does not need to measure the voltages of all the power generating elements 11; the cell voltage measuring unit 91 just needs to measure the voltage of at least one of the power generating elements 11 to thereby detect negative voltage. For example, it is known that it is highly likely that negative voltage occurs in the power generating element 11 arranged at the end portion of the fuel cell 10, at which the operating temperature tends to be the lowest, among the power generating elements 11. Then, the cell voltage measuring unit 91 may measure the voltage of only the power generating element 11 arranged at the end portion to detect negative voltage.

Next, the fifth alternative embodiment will be described. In the first embodiment, the minimum current density $i_{lim}$ is set as a minimum limit current density of the fuel cell 10 in the current restricting process, and the control unit 20 executes restart process of the fuel cell 10 using the minimum current density $i_{lim}$ as a threshold. However, the minimum current density $i_{lim}$ may not be set in the control unit 20.

Next, the sixth alternative embodiment will be described. In the third or fourth embodiment, one of the humidity inside the fuel cell 10 and the operating temperature of the fuel cell 10 is regulated to execute the process of expanding the operation allowable range. However, it is also applicable that both the humidity inside the fuel cell 10 and the operating temperature of the fuel cell 10 are regulated to expand the operation allowable range. In this case, it is desirable that an allowable range map $M_{PA}$ is prepared for each combination of the humidity inside the fuel cell 10 and the operating temperature of the fuel cell 10.

Next, the seventh alternative embodiment will be described. In the third or fourth embodiment, the allowable range changing unit 22 selects the map corresponding to the humidity inside the fuel cell 10 or the operating temperature of the fuel cell 10 from among the allowable range maps $M_{PA}$ prepared in advance for each humidity inside the fuel cell 10 or each operating temperature of the fuel cell 10 to expand the operation allowable range. However, the allowable range changing unit 22 may use a preset arithmetic expression, algorithm, or the like, to correct the correlation set in the allowable range map $M_{PA}$ in response to the humidity inside the fuel cell 10 or the operating temperature of the fuel cell 10 to thereby expand the operation allowable range.

Next, the eighth alternative embodiment will be described. In the above described embodiments, the correlation between current densities of the fuel cell 10 and accumulated current values of the fuel cell 10 is set in the allowable range map $M_{PA}$. However, the correlation between current values, instead of current densities, of the fuel cell 10 and accumulated current values of the fuel cell 10 may be set in the allowable range map $M_{PA}$. The current value of the fuel cell 10 is obtained by multiplying the current density by the area of the electrode, so the correlation between current values of the fuel cell 10 and accumulated current values of the fuel cell 10 may also be considered as one type of correlation between current densities of the fuel cell 10 and accumulated current values of the fuel cell 10.

Next, the ninth alternative embodiment will be described. In the fuel cell systems according to the above described embodiments, when the negative voltage cell has not recovered from negative voltage after the amount of supplied cathode gas is increased, it is determined that negative voltage is generated because of poor hydrogen supply, and then the current restricting process is executed. However, it is also applicable that the current restricting process is started after negative voltage has been detected without executing the process of recovering from negative voltage by increasing the amount of supplied cathode gas.

Next, the tenth alternative embodiment will be described. In the fuel cell systems according to the above described embodiments, the process for recovering from negative voltage is started when negative voltage has been detected, and the current restricting process is executed in that process. However, it is also applicable that, in the fuel cell system, the current restricting process is executed when a preset environmental condition that indicates a possibility that negative voltage is generated is satisfied even when negative voltage has not been detected. For example, the current restricting process described in the above embodiments may be executed under an environment that the outside air temperature is at or below zero, when the temperature of the fuel cell 10 is near a temperature at or below zero, or the like. In addition, the warning process (step S63 of FIG. 12), the allowable range changing process (step S65 of FIG. 16) or the refrigerant control process (step S68 of FIG. 22, step S68F of FIG. 24) in accordance with the current restricting process may be executed.

Next, the eleventh alternative embodiment will be described. In the above described second, third or fourth embodiment, as is described in another configuration example of the first embodiment, the accumulated current value may be nonvolatily recorded in the accumulated current value recording unit 23. In addition, when the limit accumulated current value is larger than or equal to a predetermined threshold or when the restricted current density is lower than or equal to a predetermined threshold, the warning process may be executed by the warning unit 25.

Next, the twelfth alternative embodiment will be described. In the above described fifth embodiment, it is determined whether to continue supply of refrigerant on the basis of the estimated heat value Qe or the estimated temperature Te of the fuel cell 10, calculated using the assumed heat capacity Cc. Instead, the control unit 20 may control the flow rate of refrigerant supplied to the fuel cell 10 on the basis of the operating temperature of the fuel cell 10 and the estimated heat value Qe. That is, the control unit 20 may decrease the flow rate of refrigerant supplied to the fuel cell 10 as the estimated heat value Qe reduces, and may decrease the degree of decrease in the flow rate of supplied refrigerant as the operating temperature of the fuel cell 10 increases.

Next, the thirteenth alternative embodiment will be described. In the above described fifth embodiment, the control unit 20 uses the map or table prepared in advance to acquire an assumed heat capacity Cc corresponding to the temperature of the fuel cell 10 and the temperature of refrigerant. However, the control unit 20 may have an assumed heat capacity Cc as a constant that is irrelevant to the temperature of the fuel cell 10 or the temperature of refrigerant. In this case, the assumed heat capacity Cc may be set as the sum (CFC+CRE) of the total CFC of heat capacities of the components of the fuel cell 10 and the heat capacity CRE of a constant amount of refrigerant present inside the fuel cell 10.

The invention claimed is:

1. A fuel cell system that outputs electric power in response to a request from an external load, comprising:
    a fuel cell that has at least one power generating element;
    a negative voltage detecting unit that is programmed to detect negative voltage in the at least one power generating element;
    a control unit that is programmed to control electric power output from the fuel cell; and
    an accumulated current value measuring unit that is programmed to measure an accumulated current value that is obtained by time integration of current output from the fuel cell,
    wherein
        the control unit is programmed to prestore a correlation between accumulated current values that are allowable in a period during which negative voltage is generated in the at least one power generating element and current densities that are allowable in the period, and
        when negative voltage has been detected in the at least one power generating element, the control unit is programmed to execute output restricting process of restricting electric power output from the fuel cell so as to fall within an operation allowable range defined by the allowable accumulated current values and allowable current densities of the correlation.

2. The fuel cell system according to claim 1, wherein
when the correlation is shown by a graph of which a first axis represents an accumulated current value of the fuel cell and a second axis represents a current density of the fuel cell, the correlation is shown as a downward-convex curve in which the allowable current density decreases as the allowable accumulated current value increases.

3. The fuel cell system according to claim 2, wherein
in the output restricting process, the control unit is programmed to decrease the current density of the fuel cell along the downward-convex curve, which indicates maximum values of the allowable current densities, with an increase in the accumulated current value.

4. The fuel cell system according to claim 1, further comprising:
    an operating state regulating unit that is programmed to include at least one of a humidifying unit that controls a humidification amount of reaction gas supplied to the fuel cell in order to regulate a wet state inside the fuel cell and a refrigerant supply unit that controls a flow rate of refrigerant supplied to the fuel cell in order to regulate an operating temperature of the fuel cell; and
    a correlation changing unit that is programmed to change the correlation in response to at least one of the wet state inside the fuel cell and the operating temperature of the fuel cell, wherein
    when a current density corresponding to an output current required from the external load in a period during which negative voltage is generated in the at least one power generating element is larger than a predetermined value, the control unit is programmed to cause the operating state regulating unit to regulate at least one of the wet state inside the fuel cell and the operating temperature of the fuel cell so as to expand the operation allowable range in such a manner that the correlation is changed by the correlation changing unit.

5. The fuel cell system according to claim 1, wherein
when the output restricting process is completed, the control unit is programmed to nonvolatily store an accumulated current value of current output from the fuel cell in the output restricting process, and, when the output restricting process is resumed, the control unit is programmed to execute the output restricting process using a total accumulated current value that is obtained by adding the stored accumulated current value and an accumulated current value of current output from the fuel cell after the output restricting process is resumed.

6. The fuel cell system according to claim 1, further comprising:
a warning unit that is programmed to warn a user of degradation of the fuel cell, wherein
the control unit is programmed to prestore a lower limit value of the current density of the fuel cell, and, when the current density of the fuel cell is lower than the lower limit value in the output restricting process, the control unit is programmed to cause the warning unit to warn the user of degradation of the fuel cell.

7. The fuel cell system according to claim 1, further comprising:
a refrigerant supply unit that is programmed to supply refrigerant to the fuel cell to thereby control a temperature of the fuel cell; and
a temperature measuring unit that is programmed to measure an operating temperature of the fuel cell, wherein
in the output restricting process, the control unit is programmed to obtain an estimated heat value that is a heat value of the fuel cell when the fuel cell is caused to output electric power at a current density based on a current density command value to the fuel cell, and to control an amount of the refrigerant supplied to the fuel cell by the refrigerant supply unit on the basis of the operating temperature measured by the temperature measuring unit and the estimated heat value.

8. The fuel cell system according to claim 7, wherein
in the output restricting process, the control unit is programmed to use the estimated heat value and the operating temperature measured by the temperature measuring unit to calculate an estimated temperature increase of the fuel cell when the fuel cell is caused to output electric power for a predetermined period of time while the fuel cell is being supplied with refrigerant, and, when the estimated temperature increase is smaller than or equal to a preset threshold, the control unit is configured programmed to cause the fuel cell to generate electric power in a state where the refrigerant supply unit is caused to stop supply of the refrigerant to the fuel cell.

9. The fuel cell system according to claim 8, wherein
in the output restricting process, when a rate of increase in the operating temperature of the fuel cell is lower than a preset threshold, the control unit is programmed to cause the fuel cell to generate electric power in a state where the refrigerant supply unit is caused to stop supply of the refrigerant to the fuel cell.

10. A fuel cell system that outputs electric power generated in response to a request from an external load, comprising:
a fuel cell that has at least one power generating element;
a control unit that is programmed to control electric power output from the fuel cell;
an accumulated current value measuring unit that is programmed to measure an accumulated current value that is obtained by time integration of current output from the fuel cell, wherein
the control unit is programmed to prestore a correlation between accumulated current values that are allowable in a period during which negative voltage is generated in the at least one power generating element and current densities that are allowable in the period, and
when a preset environmental condition that indicates a possibility that negative voltage is generated is satisfied, the control unit is programmed to determine that negative voltage is generated in the at least one power generating element and then to execute output restricting process of restricting electric power output from the fuel cell so as to fall within an operation allowable range defined by the allowable accumulated current values and allowable current densities of the correlation.

11. The fuel cell system according to claim 10, wherein
when the correlation is shown by a graph of which a first axis represents an accumulated current value of the fuel cell and a second axis represents a current density of the fuel cell, the correlation is shown as a downward-convex curve in which the allowable current density decreases as the allowable accumulated current value increases.

12. The fuel cell system according to claim 11, wherein
in the output restricting process, the control unit is programmed to decrease the current density of the fuel cell along the downward-convex curve, which indicates maximum values of the allowable current densities, with an increase in the accumulated current value.

13. The fuel cell system according to claim 10, further comprising:
an operating state regulating unit that is programmed to include at least one of a humidifying unit that controls a humidification amount of reaction gas supplied to the fuel cell in order to regulate a wet state inside the fuel cell and a refrigerant supply unit that controls a flow rate of refrigerant supplied to the fuel cell in order to regulate an operating temperature of the fuel cell; and
a correlation changing unit that is programmed to change the correlation in response to at least one of the wet state inside the fuel cell and the operating temperature of the fuel cell, wherein
when a current density corresponding to an output current required from the external load in a period during which negative voltage is generated in the at least one power generating element is larger than a predetermined value, the control unit is programmed to cause the operating state regulating unit to regulate at least one of the wet state inside the fuel cell and the operating temperature of the fuel cell so as to expand the operation allowable range in such a manner that the correlation is changed by the correlation changing unit.

14. The fuel cell system according to claim 10, wherein
when the output restricting process is completed, the control unit is programmed to nonvolatily store an accumulated current value of current output from the fuel cell in the output restricting process, and, when the output restricting process is resumed, the control unit is programmed to execute the output restricting process using a total accumulated current value that is obtained by adding the stored accumulated current value and an accumulated current value of current output from the fuel cell after the output restricting process is resumed.

15. The fuel cell system according to claim 10, further comprising:
a warning unit that is programmed to warn a user of degradation of the fuel cell, wherein
the control unit is programmed to prestore a lower limit value of the current density of the fuel cell, and, when the current density of the fuel cell is lower than the lower limit value in the output restricting process, the control unit is programmed to cause the warning unit to warn the user of degradation of the fuel cell.

16. The fuel cell system according to claim 10, further comprising:
a refrigerant supply unit that is programmed to supply refrigerant to the fuel cell to thereby control a temperature of the fuel cell; and
a temperature measuring unit that is programmed to measure an operating temperature of the fuel cell, wherein in the output restricting process, the control unit is programmed to obtain an estimated heat value that is a heat value of the fuel cell when the fuel cell is caused to output electric power at a current density based on a current density command value to the fuel cell, and to control an amount of the refrigerant supplied to the fuel cell by the refrigerant supply unit on the basis of the operating temperature measured by the temperature measuring unit and the estimated heat value.

17. The fuel cell system according to claim 16, wherein in the output restricting process, the control unit is programmed to use the estimated heat value and the operating temperature measured by the temperature measuring unit to calculate an estimated temperature increase of the fuel cell when the fuel cell is caused to output electric power for a predetermined period of time while the fuel cell is being supplied with refrigerant, and, when the estimated temperature increase is smaller than or equal to a preset threshold, the control unit is programmed to cause the fuel cell to generate electric power in a state where the refrigerant supply unit is caused to stop supply of the refrigerant to the fuel cell.

18. The fuel cell system according to claim 17, wherein in the output restricting process, when a rate of increase in the operating temperature of the fuel cell is lower than a preset threshold, the control unit is programmed to cause the fuel cell to generate electric power in a state where the refrigerant supply unit is caused to stop supply of the refrigerant to the fuel cell.

\* \* \* \* \*